United States Patent
Teppler

(10) Patent No.: US 6,792,536 B1
(45) Date of Patent: Sep. 14, 2004

(54) SMART CARD SYSTEM AND METHODS FOR PROVING DATES IN DIGITAL FILES

(75) Inventor: Steven W. Teppler, Washington, DC (US)

(73) Assignee: TimeCertain LLC, Washington, DC (US)

(*) Notice: Subject to any disclaimer, the term of this patent is extended or adjusted under 35 U.S.C. 154(b) by 0 days.

(21) Appl. No.: 09/421,279

(22) Filed: Oct. 20, 1999

(51) Int. Cl.[7] .................................................. H04L 9/00
(52) U.S. Cl. ........................ 713/178; 713/415; 713/201
(58) Field of Search ................................ 713/178, 175, 713/207; 705/44

(56) References Cited

U.S. PATENT DOCUMENTS

| | | | |
|---|---|---|---|
| 5,001,752 A | | 3/1991 | Fischer |
| 5,022,080 A | | 6/1991 | Durst et al. |
| 5,136,643 A | | 8/1992 | Fischer |
| 5,136,646 A | | 8/1992 | Haber et al. |
| 5,136,647 A | | 8/1992 | Haber et al. |
| 5,189,700 A | | 2/1993 | Blandford |
| 5,373,561 A | | 12/1994 | Haber et al. |
| RE34,954 E | | 5/1995 | Haber et al. |
| 5,422,953 A | | 6/1995 | Fischer |
| 5,500,897 A | | 3/1996 | Hartman, Jr. |
| 5,619,571 A | | 4/1997 | Sandstrom et al. |
| 5,748,738 A | | 5/1998 | Bisbee et al. |
| 5,781,629 A | | 7/1998 | Haber et al. |
| 5,781,630 A | | 7/1998 | Huber et al. |
| 5,903,882 A | * | 5/1999 | Asay et al. .................... 705/44 |
| 5,910,988 A | | 6/1999 | Ballard |
| 5,923,763 A | | 7/1999 | Walker et al. |
| 5,970,146 A | | 10/1999 | McCall et al. |
| 6,047,282 A | | 4/2000 | Wilson et al. |
| 6,081,899 A | | 6/2000 | Byrd |
| 6,209,090 B1 | | 3/2001 | Aisenberg et al. |
| 6,209,091 B1 | * | 3/2001 | Sudia et al. ................. 713/175 |
| 6,226,744 B1 | * | 5/2001 | Murphy et al. .............. 713/200 |
| 6,237,096 B1 | * | 5/2001 | Bisbee et al. ................ 713/178 |
| 6,253,331 B1 | | 6/2001 | Kotami |
| 6,263,438 B1 | | 7/2001 | Walker et al. |
| 6,356,937 B1 | | 3/2002 | Montville et al. |
| 6,393,126 B1 | | 5/2002 | van der Kaay et al. |
| 6,393,566 B1 | | 5/2002 | Levine |
| 6,408,388 B1 | | 6/2002 | Fischer |
| 6,442,691 B1 | | 8/2002 | Blandford |
| 6,449,255 B1 | | 9/2002 | Waclawsky |
| 6,490,355 B1 | | 12/2002 | Epstein |
| 6,530,023 B1 | | 3/2003 | Nissl et al. |
| 6,601,172 B1 | | 7/2003 | Epstein |
| 2001/0011350 A1 | | 8/2001 | Zabetian |

FOREIGN PATENT DOCUMENTS

GB 2323455 A 9/1998

OTHER PUBLICATIONS

D. Mills, "Simple Network Time Protocol (SNTP) Version 4 for IPva, IPv6, and OSI", Oct. 1996.

* cited by examiner

Primary Examiner—Kim Vu
Assistant Examiner—Thanhnga B. Truong
(74) Attorney, Agent, or Firm—Venable LLP; James R. Burdett; W. Russell Swindell

(57) ABSTRACT

A smart card system and methods for proving dates of digital data files includes a trusted time source, a first subsystem for saving the file at a moment in time, a second subsystem for retrieving from the trusted time source a date and a time corresponding to the moment in time, a third subsystem for appending the date and the time retrieved from the trusted time source to the saved file, a fourth subsystem for signing the saved file with the date and the time retrieved from the trusted time source appended thereto, a fifth subsystem for hashing the signed file to produce a digest, a sixth subsystem for signing the digest with a key to produce a certificate, a seventh subsystem for appending the certificate to the saved file, and an eighth subsystem for saving the file with the certificate appended thereto. All of the subsystems are preferably sealed together within a smart card.

20 Claims, 10 Drawing Sheets

SMART CARD SYSTEM AND METHODS FOR PROVING DATES IN DIGITAL FILES

CROSS REFERENCE TO RELATED APPLICATIONS

This application claims the benefit of U.S. Provisional Application No. 60/142,132, filed on Jul. 2, 1999. This application is related to the following co-pending, commonly assigned applications: U.S. patent application Ser. No. 09/649,646, entitled "METHOD AND SYSTEM FOR DETERMINING AND MAINTAINING TRUST IN DIGITAL DATA FILES WITH CERTIFIABLE TIME," filed Jul. 3, 2000; U.S. patent application Ser. No. 09/429,360, entitled "PERSONAL COMPUTER SYSTEM AND METHODS FOR PROVING DATES IN DIGITAL DATA FILES," filed Oct. 28, 1999; and U.S. patent application Ser. No. 09/609,645, entitled "METHOD AND SYSTEM FOR DETERMINING AND MAINTAINING TRUST IN DIGITAL IMAGE FILES WITH CERTIFIABLE TIME," filed Jul. 3, 2000.

BACKGROUND OF THE INVENTION

1. Field of the Invention

The present invention relates generally to digital data files, and more particularly to a smart card system and methods for proving dates in such digital data files.

2. Statement of the Prior Art

Scope of the Problem

Digital data files come in many formats. None of those formats currently provide means for proving—with certainty—dates and times associated with access, creation, modification, receipt, or transmission of such digital data files. This is not only due to the variety of application programs which are available for digital data file access, creation, modification, receipt, and transmission, but also due to the much more varied "standards" and protocols put forth in the vain attempt to provide uniformity worldwide.

Illustrative of the enormity of the problem are the following operating environments, within which the system and methods according to the present invention can provide the much-needed but often ignored time certainty.

Digital Document Processing

"Processing" may be viewed as the manipulation of data within a computer system. Since virtually all computer systems today process digital data, processing is the vital step between receiving the data in binary format (i.e., input), and producing results (i.e., output)—the task for which computers are designed.

The *Microsoft® press Computer Dictionary, 3d Edition* (1997) defines the term document as " . . . any self-contained piece of work created with an application program and, if saved on disk, given a unique filename by which it can be retrieved." Most people think of documents as material done by word processors alone. To the typical computer, however, data is little more than a collection of characters. Therefore, a database, a graphic, or a spreadsheet can all be considered as much a document as is a letter or a report. In the Macintosh environment in particular, a document is any user-created work named and saved as a separate file.

Accordingly, for the purpose of the invention described herein, digital document processing shall be interpreted to mean the manipulation of digital (i.e., binary) data within a computer system to create or modify any self-contained piece of work with an application program and, if saved on a disk or any other memory means, given a unique filename by which it can be retrieved. Examples of such application programs with which the present invention may be used to assist in such digital document processing are: Microsoft® Access 97, Microsoft® Excel 97, and Microsoft® Word 97, each available from Microsoft Corporation, Redmond, Wash. U.S.A.

Digital Communications

"Communications" may be broadly defined as the vast discipline encompassing the methods, mechanisms, and media involved in information transfer. In computer-related areas, communications usually involve data transfer from one computer to another through a communications medium, such as a telephone, microwave relay, satellite link, or physical cable.

Two primary methods of digital communications among computers presently exist. One method temporarily connects two computers through a switched network, such as the public telephone system. The other method permanently or semi-permanently links multiple workstations or computers in a network. In reality, neither method is distinguishable from the other, because a computer can be equipped with a modem, which is often used to access both privately owned and public access network computers.

More particular forms of digital communications (i.e., exchange of communications in which all of the information is transmitted in binary-encoded, digital format) include electronic mail (or less formally "e-mail"), facsimile, voicemail, and multimedia communications.

E-mail may be broadly defined as the exchange of text messages/computer files over a communications network, such as a local area network (LAN) or the Internet, usually between computers or terminals. Facsimile (or, again, less formally "fax") comprises the transmission and reception of text or graphics over telephone lines in digitized form. Conventional fax machines scan an original document, transmit an image of the document as a bit map, and reproduce the received image on a printer. Resolution and encoding of such fax messages are standardized in the CCITT Groups 1–4 recommendations. Fax images can likewise be sent and received by computers equipped with fax hardware and software.

The CCITT Groups 1–4 recommendations make up a set of standards recommended by the Comité Consultatif International Télégraphique et Téléphonique (now known as the International Telecommunication Union) for encoding and transmitting images over fax machines. Groups 1 and 2 relate to analog devices, which are generally out of use. Groups 3 and 4 deal with digital devices, and are outlined below.

Group 3 is a widespread standard that supports "standard" images of 203 horizontal dots per inch (dpi) by 98 vertical dpi, and "fine" images of 203 horizontal dpi by 198 vertical dpi. Group 3 devices support two methods of data compression. One is based on the Huffman code, and reduces an image to 10 to 20 percent of the original. The other, known as "READ" (for "relative element address designate"), compresses an image to about six to twelve percent (~6%–12%) of its original. Additionally, the READ method provides for password protection as well as polling, so that a receiving machine can request transmission as appropriate.

Group 4 is a newer standard, which supports images of up to 400 dpi. Its method of data compression is based on a beginning row of white pixels, or "dots", with each succeeding line encoded as a series of changes from the line before. Images are compressed to about three to ten percent (~3%–10) of the original. Group 4 devices do not include error-correction information in their transmission. Moreover, they require an Integrated Services Digital Network (ISDN) phone line rather than a traditional dial-up line.

Fax modems may also be used to send and receive digital data encoded in known fax formats (e.g., one of the CCITT groups noted above). Such data is either sent or received by a fax machine or another modem, which then decodes the data and converts it to an image. If the data was initially sent by fax modem, the image must previously have been encoded on the computer hosting such fax modem. Text and graphic documents can be converted into fax format by special software that is usually provided with the fax modem. Paper documents must first be scanned in. As is well known, fax modems may be internal or external and may combine fax and conventional modem capabilities.

Voicemail generally comprises a system that records and stores telephone messages in a computer's memory. Unlike a simple answering machine, voicemail systems include separate mailboxes for multiple users, each of whom can copy, store, or redistribute messages. Another type of digital communications involving voice is "voice messaging", a term which generally refers to a system that sends and receives messages in the form of sound recordings. Typical voice messaging systems may employ "voice modems", which are modulation/demodulation devices that support a switch to facilitate changes between telephony and data transmission modes. Such a device might contain a built-in loudspeaker and microphone for voice communication, but more often it uses the computer's sound card.

Still another form of digital communications includes multimedia communications in the style of "video teleconferencing", as defined by the International Telecommunication Union (formerly CCITT) in "Visual Telephone Systems and Equipment for Local Area Networks Which provide a Non-Guaranteed Quality of Service," (Recommendation H.323, Telecommunication Standardization Sector of ITU, Geneva, Switzerland, May 1996) and other similar such standards.

Digital Imaging

"Digital imaging" encompasses those known processes involved in the capture, storage, display, and printing of graphical images. They may involve devices known as a "digital camera", which broadly refers to a camera that stores photographed images electronically instead of on traditional film. Digital cameras typically use charge-coupled device (CCD) elements to capture the image through the lens when the operator releases the shutter in the camera. Circuits within the camera cause the image captured by the CCD to be stored in a storage medium, such as solid-state memory or a hard disk. After the image has been captured, it is downloaded by cable to the computer using software supplied with the camera. Once stored in the computer, the image can be manipulated and processed much like the image from a scanner or related input devices. Digital cameras come in the form of still cameras and full-motion video recorders.

Other forms of digital imaging include digitizing systems, such as the "PhotoCD®" system from Eastman Kodak Company, Rochester, N.Y. That system allows 35 mm film pictures, negatives, slides, and scanned images to be stored on a compact disc. Images are then stored in a file format known as the Kodak PhotoCD Image pac File Format, or PCD. Many photography and film development businesses offer this service. Any computer with CD-ROM capabilities can usually view images stored on a PhotoCD and the software required to read PCD. Additionally, such images can be viewed by any one of a variety of players that are specifically designed to display images stored on CDs. Another photographic form of digital imaging is defined by the "Flashpix" specification, the cooperative endeavor of the Digital Imaging Group, Microsoft, the Hewlett-packard Company, and Live picture, Inc. The Flashpix format builds on the best features of existing formats (e.g., Kodak Image pac, Live picture IVUE, Hewlett-packard JPEG, TIFF, TIFF/EP, etc.), and combines these features with an object orientated approach.

Still other forms of digital imaging include digital radiography, radiotherapy, x-ray, positron emission tomography, ultrasound, and magnetic resonance imaging according to the joint work of the American College of Radiology (ACR) and the National Electrical Manufacturers Association (NEMA), published in the *Digital Imaging and Communications in Medicine PS* 3-1998 (DICOM Standard).

Digital Commerce

An enormous amount of commercial activity now takes place by means of connected computers. Such commercial activity has been variously coined as digital commerce, electronic commerce, or just plain E-commerce. Regardless of its particular moniker, these activities generically involve a commercial transaction between a user and a vendor through an online information service, the Internet, or a BBS, or between vendor and customer computers through a specialized form of E-commerce known as electronic data interchange (EDI).

EDI is collectively known for its set of standards to control the transfer of business documents (e.g., purchase orders and invoices) between computers. The ultimate goal of EDI is the elimination of paperwork and increased response time. For EDI to be most effective, users must agree on certain standards for formatting and exchanging information, such as the X.400 protocol and CCITT X series.

Other known forms of E-commerce include digital banking, web-front stores, and online trading of bonds, equities, and other securities. Digital banking can take the form of access to a user's account, payment of bills electronically, or transfer of funds between a user's accounts. Web-front stores (e.g., amazon.com) usually comprise a collection of web pages in the form of an electronic catalog, which offers any number of products for sale. More often than not, transactions at such web-front stores are consummated when a purchaser enters his credit card number, and the issuing bank approves the purchase. These transactions may or may not be over secure lines, such as those designated "TRUSTe" participant web sites. Further details regarding known processes for establishing and maintaining secure E-commerce connections may be found in the SET Secure *Electronic Transaction Specification, Book 1: Business Description* (Version 1.0), May 31, 1997, the contents of which are incorporated herein by reference. See also *Book 2 (Programmer's Guide)* and *Book 3 (Formal Protocol Definition)* of the *SET Secure Electronic Transaction Specification*, as well as the *External Interface Guide to SET Secure Electronic Transaction*, Sep. 24, 1997, each of which is incorporated herein by reference.

One burgeoning form of E-commerce that has arisen in the past few years is that which involves dealing in securities online. "Day traders" watch impatiently as ticker symbols speed across their computer screens. When the price is right, they electronically whisk their order off to a distant securities dealer—often buying and selling the same stock or bond in a fifteen-minute span of time. One can only imagine the potential problems associated with the purchase or sale of securities when price-per-share movements on the order of a few cents make the difference to these day traders. Fortunately, the National Association of Securities Dealers (NASD) has come up with its Order Audit Trail Systems (OATS$^{SM}$) to track all stock transactions. NASD Rule 6953 also requires all member firms that have an obligation to record order, transaction, or related data under the NASD Rules or Bylaws to synchronize the business clocks that are used for recording the date and time of any market event. Computer system and mechanical clocks must be synchronized every business day before market open, at a minimum, in order to ensure that recorded order event timestamps are accurate.

Digital Justice

Even legal scholars and systems around the world have been unable to escape the problems of an online world. Utah became the first jurisdiction in the United States of America to enact legislation creating "cybernotaries". Similar laws in Georgia, Florida, and Massachusetts quickly followed Utah.

In August 1996, the American Bar Association (through its Information Security Committee of the Electronic Commerce and Information Technology Division, Section of Science and Technology) published the *Digital Signature Guidelines—Legal Infrastructure for Certification Authorities and Secure Electronic Commerce*. The European Union, as well, in a final report on the *Legal Issues Of Evidence And Liability In The provision Of Trusted Services (CA and TTP Services)*, let its position be known in October 1998.

Each of the environments noted above is fraught with potential fraud. Any reliance they may have on dates and times is merely for the purpose of determining whether the transaction is valid (i.e., authorized within a specified range of time), or what specific time delays occur in the transmission of data between the computer systems communicating with one another. However, none of those environments currently provide means for proving—with certainty—dates and times associated with access, creation, modification, receipt, or transmission of digital data files, which may be used therein.

Prior Art Attempts to Solve the Problem

Many-varied computing means pervade today's society. PCs, web browsers, e-mail clients, e-mail servers, network file servers, network messaging servers, mainframes, Internet appliances, wireless telephones, pagers, PDAs, fax machines, fax modems, digital still cameras, video cameras, voice recorders, video recorders, copiers, and scanners, and virtually any other device using digital data files are fast becoming ubiquitous.

Digital data is easy to modify. As a result, it has been nearly impossible in the prior art to establish with certainty the date and time a particular digital data file in a given computing means was accessed, created, modified, received, or transmitted. It should be understood that, by use of the term "computing means", the present invention is directed to general purpose computers, PCs, web browsers, e-mail clients/servers, network file/messaging servers, mainframes, Internet appliances, wireless telephones, pagers, PDAs, fax machines, digital still/video cameras, digital voice/video recorders, digital copiers/scanners, interactive television, hybrid combinations of any of the above-noted computing means and an interactive television (e.g., set-top boxes), and any other apparatus, which generally comprises a processor, memory, the capability to receive input, and the capability to generate output.

Such computing means typically include a real time clock ("RTC") for keeping track of the time and date. Likewise, operating systems and/or applications programs used in such computing means usually stamp the time and date (as derived from the RTC) that each of the digital data files is accessed, created, modified, received, or transmitted. Such stamping of digital data files with times and dates (collectively referred to as "time-stamping") has, thus, become an integral part of all of the above known computing environments.

Although the existing framework of time-stamping can be used to catalogue and sort one's own files, for other critical needs it suffers from two fatal flaws. Files are typically "time-stamped" with a value read from the RTC. There is no simple way of determining whether the RTC is set to the correct date and time. Indeed, it is quite trivial for a user to reset the RTC to any desirable date and time. Even if the computing means' RTC had been correctly set, nothing would prevent a user from arbitrarily changing the "time-stamps" themselves. This is readily accomplished through the direct manipulation of the digital data where the time-stamp is stored.

Thus, the known time-stamping framework is useless for any situation where the accuracy of the date or time of a digital data file is critical. Court filings, medical records, files presented as incriminating or exculpatory evidence in court cases, legal documents such as wills, billing records, patent, trademark, and copyright claims, and insurance documents are only a few of the areas where the date and time that is associated with the file is critical. Conventional systems and methods that time-stamp digital data files fail to meet this need. Furthermore, there is no "open", cross-platform, interoperable global standard in place to create trusted time-stamps.

Cryptographic Systems and Keys

One approach that has been used in the past to provide some level of security in digital data files is the use of cryptographic systems and keys. In general, cryptographic systems are used to encrypt or "lock" a digital data file. A key is used, conversely, to decrypt or "unlock" an encrypted digital data file. Digital data files are merely bits of data in memory or on a network. If this data is viewed as the mere representation of large numbers, then mathematical functions or algorithms can be easily applied to the data.

For example, where a particular digital data file is a text file, its unencrypted or "cleartext" version can be viewed as the variable x. The resulting function of this variable x, when encrypted by its associated cryptographic algorithm and coupled with its key k will be f (k, x). Accordingly, the encrypted text or "cyphertext" can be defined by the equation:

$$y=f(k, x).$$

By choosing the cryptographic algorithm carefully—such that there is no easily discovered inverse mapping (i.e., for any given y, it will be extremely difficult to calculate x without knowing k, while at the same time, with knowledge of k it will be possible)—the data may be encrypted.

Symmetric Cryptography

If the key for encryption and decryption is the same shared secret, then the cryptographic system and associated algorithm will be referred to as "symmetric". Both the sender and the receiver must share the key in such symmetric cryptographic systems. A sender first applies the encryption function using the key to the cleartext to produce the cyphertext, which is then sent to a receiver. The receiver applies the decryption function using the same shared key. Since the cleartext cannot be derived from the cyphertext without knowledge of the key, the cyphertext can be sent over public networks such as the Internet.

The current United States standard for symmetric cryptography, in which the same key is used for both encryption and decryption, is the Data Encryption Standard (DES), which is based upon a combination and permutation of shifts and exclusive ors. This approach can be very fast, whether implemented directly on hardware (e.g., 1 GByte/sec throughput or better) or in general purpose processors. The current key size of 56 bits (plus 8 parity bits) is sufficient, yet somewhat small, but the growing use of larger keys with "triple DES" generate much greater security. Since the implementation of DES is fast, it can easily be pipelined with software codecs and not impact system performance.

An alternative and yet stronger form of symmetric block encryption is IDEA. Its security is based upon combining exclusive ors with addition and multiplication in modulo-16 arithmetic. The IDEA approach is also fast on general purpose processors. It is comparable in speed to known DES implementations. One major advantage of IDEA is its keys, which are 128 bits and are, thus, much stronger (i.e., harder to break) than standard 56-bit DES keys.

One particular problem with the use of such symmetric systems is the problem of getting the sender and the receiver to agree on the key without anyone else finding out. Moreover, the problem becomes greatly complicated when additional users (i.e., potential senders and receivers) are added to the system. Such symmetric cryptographic systems, nevertheless, are by far easier to implement and deploy than their asymmetric counterparts since they require far less infrastructure. Sometimes with a symmetric cryptographic system, however, keys are submitted over the network. Avoidance of this security risk would be desirable.

Asymmetric Cryptography

Systems that generate and employ a secure key pair (i.e., a "private key" for creating the "digital signature" and a "public key" to verify that digital signature) are typically known as asymmetric cryptographic systems. There are many known cryptographic algorithms (e.g., RSA, DSA, and Diffie Hellman) that involve a key pair. In such asymmetric cryptographic systems, the private key and the public key are mathematically linked. Anything that is encrypted by the public key can only be decrypted by the private key. Conversely, anything that is signed by the private key can only be verified by the public key. Asymmetric cryptographic systems are, thus, inherently more secure than symmetric or shared secret systems. The sensitive private key need exist in only one place. No form of the private key is ever transmitted over the network. Typical asymmetric cryptographic systems also scale to many users more easily than shared secret systems. However, the infrastructure that is necessary to field systems of this type, commonly called a "public Key Infrastructure" (PKI), is non-trivial to implement. See, e.g., RFC 1422, *Privacy Enhancement for Internet Electronic Mail: Part II: Certificate-Based Key Management* (February 1996), the contents of which are incorporated herein by reference.

Digital Signatures

Referring now to FIGS. 1 and 2, wherein like reference characters or numbers represent like or corresponding parts throughout each of the several views, an exemplary process 100 for creating a digital signature is shown in FIG. 1. To sign a document, or for that matter any other digital data file, a "signer" must first delimit the borders of the digital data file to be signed. As used herein, the term signer refers to any person who creates a digital signature for a message, such as message 110. The information delimited by the signer, in turn, refers to that message 110. A hash function 120 in the signer's software is used to compute a hash result 130, which is unique for all practical purposes to the message 110. Thereafter, a signing function 140 is used to transform the hash result 130 into a digital signature 160, but only after input of the signer's private key 150.

This transformation is sometimes referred to as a process of encryption. However, such a characterization would be inaccurate, because message 110 itself may, or may not be confidential. Confidentiality may be provided as an optional feature in most digital signature technologies, but the separate and distinct security service of confidentiality is not central to the security services of signer authentication, document authentication, or digital data file authentication. In any case, the resulting digital signature 160 is unique to both the message 110 and the private key 150, which is used to create the digital signature 160.

Typically, most digital signatures 160 (i.e., the digitally-signed hash result of message 110) are used in one of two ways. They may be attached to their associated message 110 and, thereafter, simply stored. In the alternative, they may be copied 170 and coupled with digital signature 160, in the form of a single data element 180 and, thereafter, transmitted 190 to a verifier.

This single data element 180 is, in some cases as will be described in greater detail herein below, referred to as a "digital certificate". Furthermore, the digital signature 160 may be simply transmitted or stored as a separate data element, so long as it maintains a reliable association with its message 110. Each digital signature 160 is unique to the specific message 110, which has been used to create it. Otherwise, it would be counterproductive if the digital signature 160 was wholly disassociated from that message 110.

An exemplary verification process 200 for verifying digital signature 160 is shown in FIG. 2. Element 180, comprising digital signature 160 attached to message 110, is first received 190 from the signer. A new hash result 220 of the original message 110 is then computed by the verifier by means of the same hash function 120 used to create the digital signature 160.

It should be noted at this juncture that use of the term "to verify" herein, with respect to any given digital signature, message, and public key, refers to those processes of accurately determining that: (1) the digital signature 160 was created during the "operational period" of a valid certificate 180 by the private key 150 corresponding to the public key 260 listed in the certificate 180; and (2) the message 110 had not been altered since its digital signature 160 was created.

It should also be noted at this juncture that use of the term "operational period" herein refers to a period that begins on a date and time a certificate 180 is issued by a "certification authority", or on a later date and time certain if stated in the certificate 180, and ends on a date and time it expires or is earlier revoked or suspended.

Then, by use of the public key 260 and such new hash result 220, the verifier can check: (1) whether the digital signature 160 was created using the signer's private key 150; and (2) whether the newly computed hash result 220 matches the original hash result 130, which was transformed into the digital signature 160 during the signing process.

Most known verification software will confirm the digital signature 160 as "verified" if two conditions are satisfied. One condition will be satisfied if the signer's private key 150 was used to digitally sign the message 110. This condition will be met if the signer's public key 260 was used to verify the digital signature 160, because the signer's public key 260 is capable of verifying only a digital signature 160 that is created with the signer's private key 150. The other condition will be satisfied if message 110 was received unaltered. This condition will be met if the hash result 220 that is computed by the verifier turns out to be identical to the hash result 130 that is extracted from digital signature 160 during the verification process. A verifier function 240 is used to make these comparisons, while further processing of the message 110 is dependent upon whether message 110 is determined to be valid at step 280.

Digital Certificates

The term "digital certificate" as used herein generally refers to any message, which at least (1) identifies the certification authority (CA) issuing it; (2) names or identifies its "subscriber"; (3) contains the subscriber's public key; (4) identifies its operational period; and (5) is digitally signed by the CA issuing it. Metaphorically, digital certificates serve as electronic substitutes for a sealed envelope or a signer's signature. In one case, for example, VeriSign Digital ID™ (a trademark of VeriSign, Inc., Mountain View, Calif. securely resides in a signer's Internet browser or e-mail software, and enables that signer to digitally sign and encrypt e-mail. Digital certificates can also be viewed as electronic equivalents of a driver's license or a passport. Containing information that uniquely identifies the signer, the digital certificate allows the signer to: (1) digitally sign a message so the recipient knows that a message actually originated from the signer; and (2) encrypt a message so the intended recipient can decrypt and read its contents and attachments. Most digital certificates are easy to use, with point-and-click interfaces in all of the popular browsers and e-mail packages. A person seeking to verify a digital signature needs, at a minimum, (1) the public key corresponding to the private key used to create the digital signature, and (2) reliable evidence that the public key (and thus the corresponding private key of the key pair) is identified with the signer. The basic purpose of the digital certificate is to serve both these needs in a reliable manner.

Dual Signatures

As noted herein above, digital signatures and digital certificates have both been used in the past to provide some level of certainty as to the identity of a particular person accessing, creating, modifying, receiving, or transmitting a digital data file. E-commerce presents other challenges for securing digital data files. In particular, the process of providing secure electronic transactions has raised the concerns for maintaining a person's privacy. An approach that has been used in the past to provide such security is known as "dual signatures", and is illustrated below.

User B wants to send User A an offer to purchase a piece of property that User A owns and an authorization to his bank to transfer the money if User A accepts the offer. Nevertheless, User B does not want the bank to see the terms of his outstanding offer to User A, nor does he want User A to see his bank account information. User B also wants to link his offer to the transfer such that the money will only be transferred if User A accepts his offer. According to the *SET Secure Electronic Transaction Specification*, User B accomplishes all of this by digitally signing both messages with a single signature operation that creates a dual signature.

Such a dual signature is generated in four steps. First, a message digest is created for both messages sent by User B (i.e., one to User A, and one to the bank). The resulting pair of message digests is then concatenated together. Next, a message digest of the concatenated result is created. This third message digest is finally encrypted with the User B's private signature key. User B must include the message digest of the other message in order for a recipient to verify his dual signature. The recipient of either message can check then its authenticity by generating the message digest on its copy of the message, concatenating it with the message digest of the other message (as provided by the User B), and thereafter computing the message digest of the result. If the newly generated digest matches the decrypted dual signature, the recipient can trust the authenticity of the message.

In the event that User A accepts User B's offer, she sends a message to the bank indicating her acceptance and including the message digest of the offer. The bank can verify the authenticity of User B's transfer authorization, and ensure that the acceptance is for the same offer by using its digest of the authorization and the message digest presented by User A of the offer to validate the dual signature. On the one hand, the bank can therefore check the authenticity of the offer against the dual signature. It cannot, on the other hand, see the terms of the offer.

Further details regarding such known processes may be found in the *SET Secure Electronic Transaction Specification, Book1: Business Description* (Version 1.0), May 31, 1997, the contents of which are incorporated herein by reference. See also *Book2* (*Programmer's Guide*) and *Book 3* (*Formal Protocol Definition*) of the *SET Secure Electronic Transaction Specification*, as well as the *External Interface Guide to SET Secure Electronic Transaction*, Sep. 24, 1997, each of which is incorporated herein by reference.

As is best illustrated by reference to FIG. 3, the process of creating such dual signatures will now be described in greater detail. User A runs the property description 305 through a one-way algorithm 310 to produce a unique value known as the message digest 315. This is a kind of digital fingerprint of the property description 305, and will be used later to test the integrity of the message. She then encrypts the message digest 315 with her private signature key 320 to produce her digital signature 325. Next, she generates a random symmetric key 330 and uses it to encrypt the combination of the property description 305, her signature 325 and a copy of her certificate 335 containing her public signature key 340 (collectively referred to as the message 345).

To decrypt the property description 305, user B will require a secure copy of this random, symmetric key 330. User B's certificate 350, which user A must have obtained prior to initiating secure communication with him, contains a copy of his public key-exchange key 355. To ensure secure transmission of the symmetric key 330, user A encrypts it first using user B's public key-exchange key 350. The encrypted key, referred to as the digital envelope 360, will then be sent to user B along with the encrypted message 345 itself.

Likewise, the decryption process consists of the following steps. User B receives the message 345 from user A and decrypts the digital envelope 360 with his private key-exchange key 365 to retrieve the symmetric key 330. He uses the symmetric key 330 to decrypt the property description 305, user A's signature 325, and her certificate 335. He decrypts user A's digital signature 325 with her public signature key 340, which he acquires from her certificate 335. This recovers the original message digest 315 of the property description 305. He runs the property description 305 through the same one-way algorithm 310 used by user A and produces a new message digest 370 of the decrypted property description 305. Finally, he compares his message digest 370 to the one 315 obtained by use of user A's public signature key 340 contained within her digital signature 325. If both digests 315, 370 are exactly the same, user B then confirms that the message content has not been altered during transmission and that it was signed using user A's private signature key 320. On the other hand, if digests 315, 370 are not the same, then message 305 either originated somewhere else or was altered after it was signed. User B could then elect to take some appropriate action, such as notifying user A or discarding the message 305.

Digital Time-Stamps

A digital time-stamping service (DTS) issues time-stamps, which associate a date and time with a digital document in a cryptographically strong way. The digital time-stamp can be used at a later date to prove that an electronic document existed at the time stated on its time-stamp. For example, a physicist who has a brilliant idea can write about it with a word processor and have the document time-stamped. The time-stamp and document together can later prove that the scientist deserves the Nobel prize, even though an arch rival may have been the first to publish.

The manner in which such conventional time-stamping systems work is illustrated in FIG. 4. Hypothetically, a user at a computing means 400 signs a document and wants it time-stamped. The user first computes a message digest 420 of the document using a secure hash function, and second sends the message digest 420 (but not the document itself) to the DTS 440. The DTS 440 sends the user in return a digital time-stamp 460 consisting of the message digest, the date and time it was received at the DTS 440, and the signature 480 of the DTS 440. Since the message digest 420 does not reveal any information about the content of the document, the DTS 440 cannot eavesdrop on the documents it time-stamps. Thereafter, the user can ostensibly present the document and time-stamp 460 together to prove when the document was written. A verifier then computes the message digest 420 of the document, makes sure it matches the digest in the time-stamp 460, and verifies the signature 480 of the DTS 440 on the time-stamp 460.

To be reliable, the time-stamps must not be forgeable. The DTS 440 itself must have a long key if the time-stamps are to be reliable for long periods of time (e.g., several decades). Moreover, the private key of the DTS 440 must be stored with utmost security, as in a tamperproof box. The date and time must come from a clock, also inside the tamperproof box, which cannot be reset and which will keep accurate time for years or perhaps for decades. It must also be infeasible to create time-stamps without using the apparatus in the tamperproof box.

All of the above requirements greatly complicate the process of obtaining legally sufficient proof of the date and time a digital data file was accessed, created, modified, or transmitted. In fact, time-stamping a document in the manner described above only certifies the date and time that the message digest 420 was received by the DTS. It provides no proof of the date and time that the document was accessed, created, modified, or transmitted. Moreover, because the DTS is located remotely relative to the user, there is no reliable way to provide a digital time-stamp locally at the user's site.

One cryptographically-strong DTS, first implemented by Bell Communications Research, Inc. (also known as "Bellcore"), only uses software and avoids many of the requirements just described such as tamperproof hardware. It essentially combines hash values of documents into data structures known as binary trees. The "root" values of such binary trees are then periodically published in the newspaper. In these Bellcore systems, the time-stamp consists of a set of hash values, which allow a verifier to recompute the root of the tree. Since the hash functions are one-way, the set of validating hash values cannot be forged. The time associated with the document by the time-stamp is the date of publication.

The following Bellcore patents are illustrative of the above-described approach: U.S. Pat. No. 5,136,646, for "Digital Document Time-Stamping With Catenate Certificate" (Haber et al.); U.S. Pat. No. 5,136,647, for a "Method for Secure Time-Stamping of Digital Documents" (Haber et al.); U.S. Pat. No. 5,373,561, for a "Method for Secure Time-Stamping of Digital Documents" (Haber et al.); and U.S. Pat. No. Re. 34,954, which is the reissue of the '647 patent noted above and is, likewise, directed to a "Method for Secure Time-Stamping of Digital Documents" (Haber et al.). Other patents which are illustrative of similar such approaches are U.S. Pat. No. 5,748,738, for a "System and Method for Electronic Transmission, Storage and Retrieval of Authenticated Documents" (Bisbee et al.), which is assigned to Document Authentications Systems, Inc.; and U.S. Pat. No. 5,781,629, for a "Digital Document Authentication System" (Haber et al.), which is assigned to Surety Technologies, Inc. The contents of each of the above patents are incorporated herein by reference.

While each of the above approaches uses software and avoids many of the requirements for tamperproof hardware, they still require a trusted source at a remote location. None of the patents listed above teach or suggest any system or method that is capable of providing a trustworthy time-stamp at the precise location where the user's digital data files are accessed, created, modified, or transmitted. Moreover, all of the methods described in the patents listed above still leave open the possibility that two individuals may collude to falsely state the value of a hash.

Undetected alterations may still be made with appropriate cryptographic techniques. For example, one may alter a document as desired and then make other suppressed changes, such as a carriage return followed by a space-up command. Both original document and altered document may, therefore, have the same hash value. See, for example, B. Schneier, *Applied Cryptography*, Chapter 3.8, "Times-tamping Services", pages 61–65 (John Wiley & Sons, Inc. 1994), the contents of which are incorporated herein by reference.

One approach seeking to avoid such possibilities is described in U.S. Pat. No. 5,781,630 (Huber et al), which discloses a system including a cryptomodule that is coupled to a computer. A cryptomodule in accordance with the Huber at al. Pat. includes a processor; an interface coupling the processor to the computer; and memory containing algorithms and constants for three purposes: (1) encoding a document, (2) generating a digital signature to be appended to the document, and (3) producing a time-stamp to be inserted into the document. The cryptomodule also includes a pair of clocks, one of which is a radio clock and the other of which is a "non-adjustable" quartz clock.

This system according to the '630 patent depends on a comparison of the two clocks before inserting a time-stamp into the document. That is, the time that the document was created, edited, received, or transmitted is retrieved from both clocks and compared. Any discrepancy between the times retrieved is then determined. If, and only if, those discrepancies are sufficiently small, will a time-stamp based on the radio clock be inserted into the document and the document then encoded.

Another approach, which seeks to avoid problems of collusion and/or fraud, is described in U.S. Pat. No. 5,619,571 (Sandstrom et al.). Briefly summarized, Sandstrom et al. discloses an improved method of storing or retrieving electronic records, particularly those in the form of image streams (e.g., TIFF). An image identification code, time data provided by a trusted source, and a password are combined to generate a key. The image identification code and time data are stored in a public directory associated with the image data stream. Attributes of the image stream (e.g., its size and a hash of at least a segment of the image data) are also determined. The attributes are then used to generated a verification code. Subsequently, the verification code is first positioned within a private area associated with the data image stream, and then the private area is encrypted with the previously generated key.

This approach, however, suffers from two obvious disadvantages. Not only is it limited to image file formats having public and private areas, but it is also still dependent on a remote source for the time-stamp and the image identification code. It would be much more desirable to provide systems and methods of time-stamping digital data files locally and without the continuing reliance on a remote trusted source.

Still another approach to provide authenticated documents, with an authenticated time code, is described in U.S. Pat. No. 5,189,700 (Blandford). Blandford's device includes an RTC and an encryption means, which are together sealed in a tamperproof package. Powered by a battery that is located outside the tamperproof package, the RTC is used either: (1) to supplant the system clock of a computer, such that the computer cannot be booted up with an incorrect time; or (2) to provide an encrypted authentication code of time. Such time code is derived from a time retrieved from the RTC, which is combined with a device identification number. A secret key contained within the encryption means then encrypts the combination.

While devices according to Blandford, in fact, meet the objective of provided a local source of trusted time, they nevertheless suffer from two major disadvantages. Both disadvantages arise out of the design requirements of such devices. First, Blandford requires the RTC to override the computer's system clock on boot up. It would be much more desirable to avoid changing system settings in the computer, particularly the setting of its system clock. Second, Blandford requires that the RTC be powered by a source (i.e., the battery) outside of the tamperproof package. This, it is suggested, is critical to assuring several objectives: (1) ensuring that the RTC cannot be reset, or it can be reset only under strict procedures; (2) allowing the battery to be replaced in the power-up state without affecting the RTC; and (3) disabling the device, and potentially even the computer, in the event that power from the source failed. Obviously, it would be much more desirable to avoid such inconveniences.

SUMMARY OF THE INVENTION

It is, therefore, a general object of the present invention to provide novel systems, apparatus, and methods of preventing fraud in digital data files. More specifically, it is a particular object of this invention to provide systems, apparatus, methods, and articles of manufacture for proving the integrity of digital data files. Another more particular object of the present invention is to provide such systems, apparatus, methods, and articles of manufacture for time-stamping digital data files, which do not continually rely on a remote trusted source of time.

In accordance with one important aspect of the present invention, the systems and methods are directed to computing means. Non-limiting examples of such "computing means" include any: general purpose computer; mainframe; PC; web browser; e-mail client; e-mail server; network file or messaging server; Internet appliance; wireless telephone; pager; personal digital assistant (PDA); fax machine; digital still or video camera; digital voice or video recorder; digital copier or scanner; interactive television; hybrid combination of any of the above computing means and an interactive television; or any other apparatus comprising a processor, memory, the capability to receive input, and the capability to generate output.

The apparatus of the invention also includes computing means programmed with software to operate the computing means in accordance with the invention. Non-limiting examples of such "computing means" in this regard include general purpose computers and personal computers of both client and server variety. Specific, non-limiting examples of such "computing means" in this regard likewise include any: web browser; e-mail client; e-mail server; network file or messaging server; Internet appliance; wireless telephone; pager; personal digital assistant (PDA); fax machine; digital still or video camera; digital voice or video recorder; digital copier or scanner; interactive television; hybrid combination of any of the above computing means and an interactive television; or any other apparatus comprising a processor, memory, the capability to receive input, and the capability to generate output.

According to another important aspect of the present invention, the article of manufacture disclosed herein comprises a computer-readable medium embodying code segments to control a computer to perform the invention. Non-limiting examples of such "computer-readable medium" in this regard include any: magnetic hard disk; floppy disk; optical disk, (e.g., a CD-ROM, a CD-R, a CD-RW, or any disk compliant with known DVD standards); magneto-optical disk; magnetic tape; memory chip; carrier wave used to carry computer-readable electronic data, such as are used in transmitting and receiving e-mail or in accessing a network, including the Internet, intranets, extranets, virtual private networks (VPN), local area networks (LAN), and wide area networks (WAN); or any other storage device used for storing data accessible by a computer. Non-limiting examples of "code segments" include not only source code segments and object code segments, but also computer programs in any language, instructions, objects, software, or any means for controlling a computer.

The above and other objects and aspects according to the present invention are provided by a smart card system and methods for proving dates of digital data files, which generally comprises a trusted time source, means for saving the file at a moment in time, means for retrieving from the trusted time source a date and a time corresponding to the moment in time, means for appending the date and the time retrieved from the trusted time source to the saved file, means for signing the saved file with the date and the time retrieved from the trusted time source appended thereto, means for hashing the signed file to produce a digest, means for signing the digest with a key to produce a certificate, means for appending the certificate to the saved file, and means for saving the file with the certificate appended thereto. All of the foregoing means are preferably sealed together within a smart card.

DETAILED DESCRIPTION OF THE INVENTION

Figure 1:
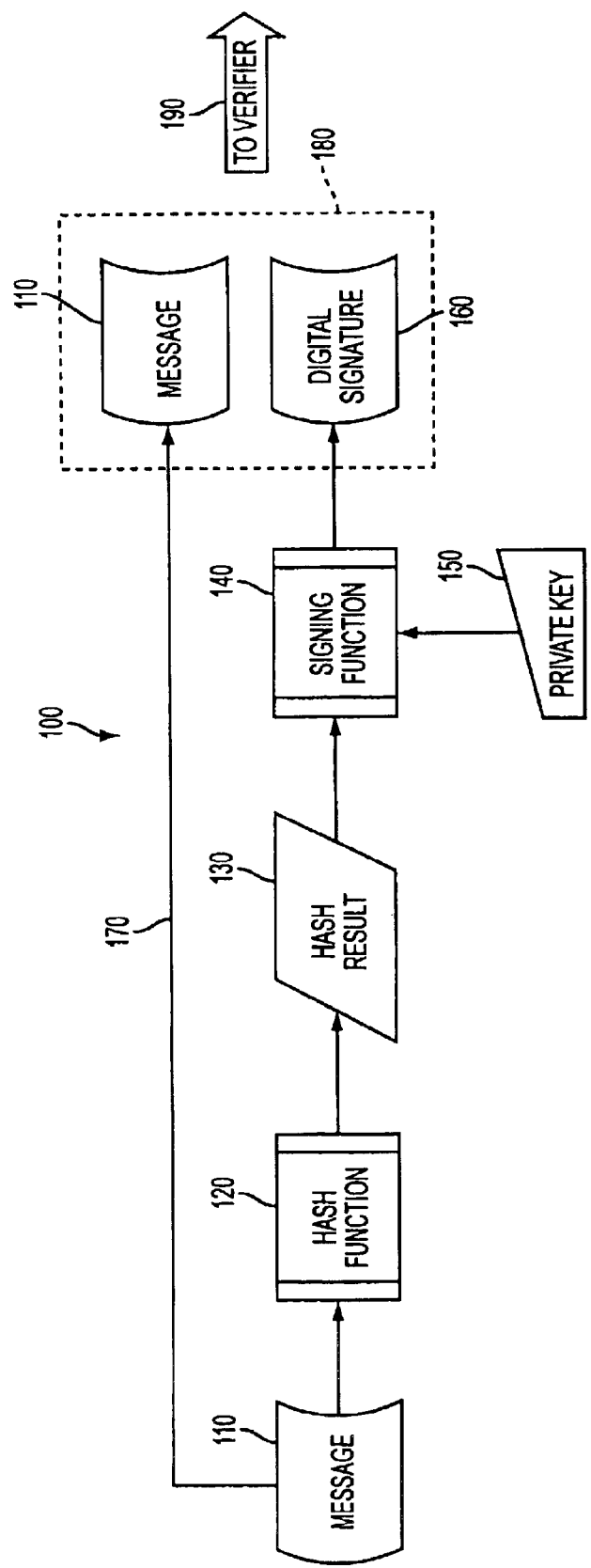
FIG. 1 is a block diagram, which illustrates one conventional process for creating a digital signature.
Figure 2:
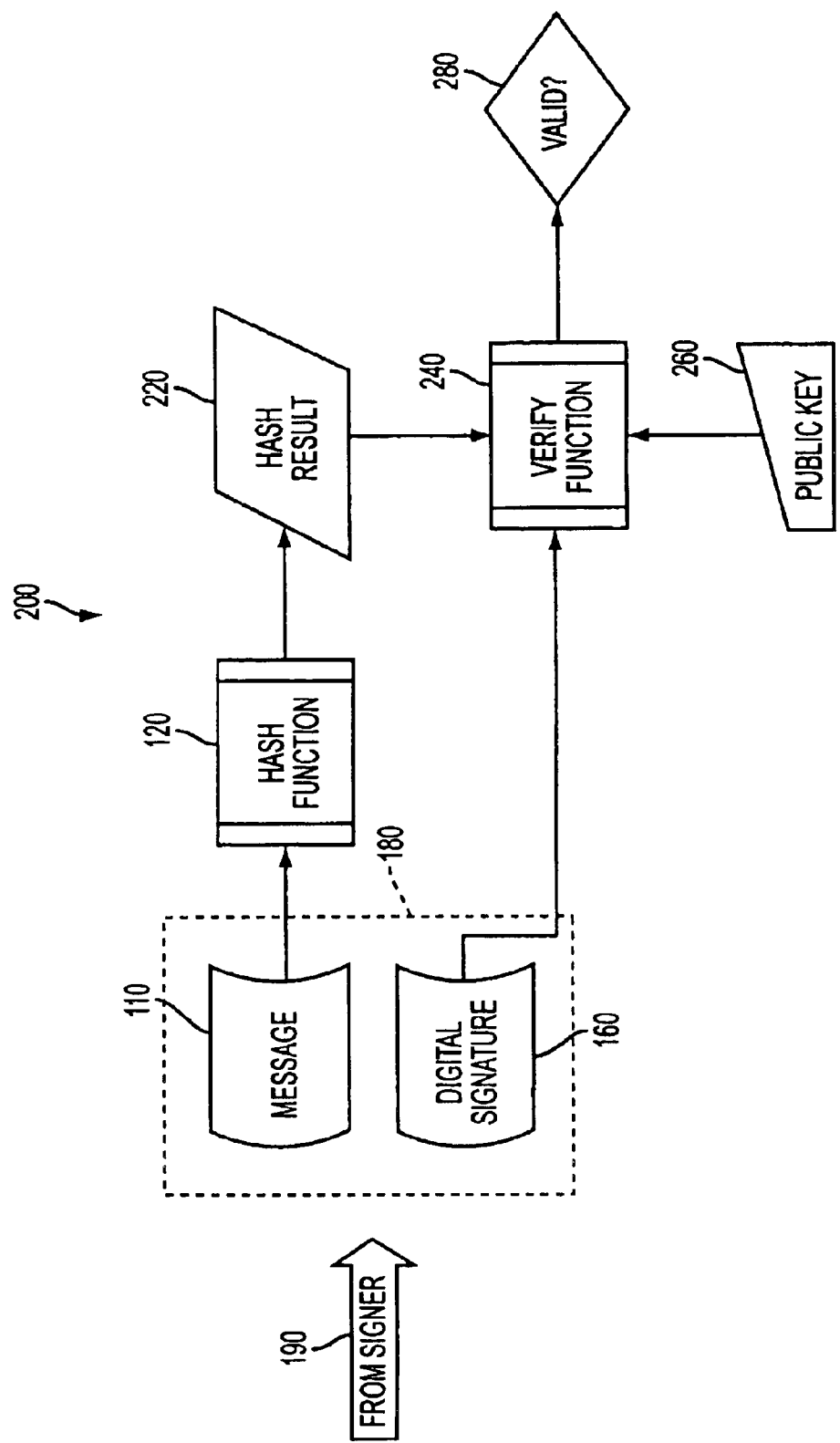
FIG. 2 is a block diagram, which illustrates another conventional process for verifying the digital signature created by the process shown in FIG. 1.
Figure 3:
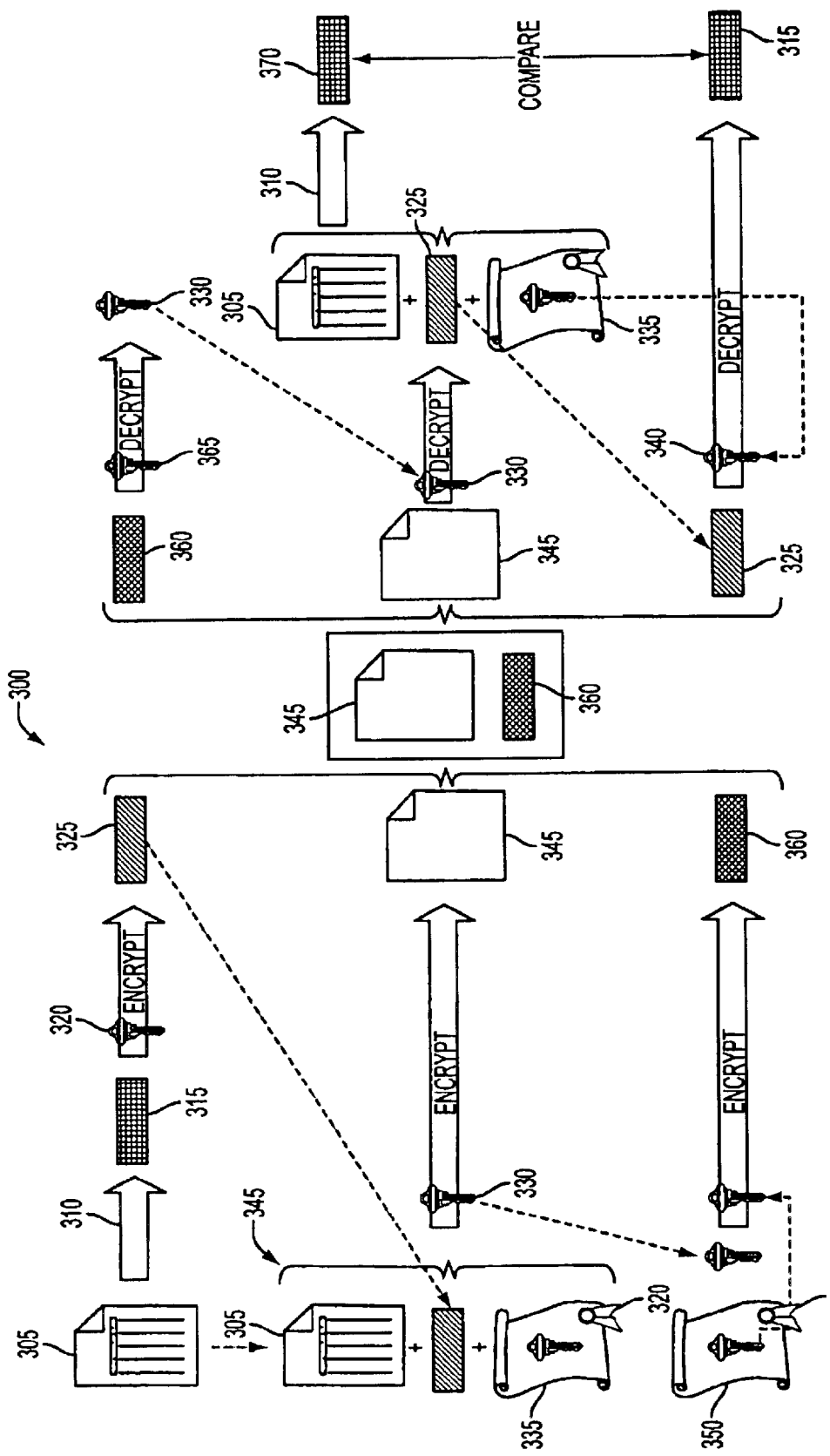
FIG. 3 is a block diagram, which illustrates yet another conventional process of using dual signatures to maintain privacy in secure electronic transactions.
Figure 4:
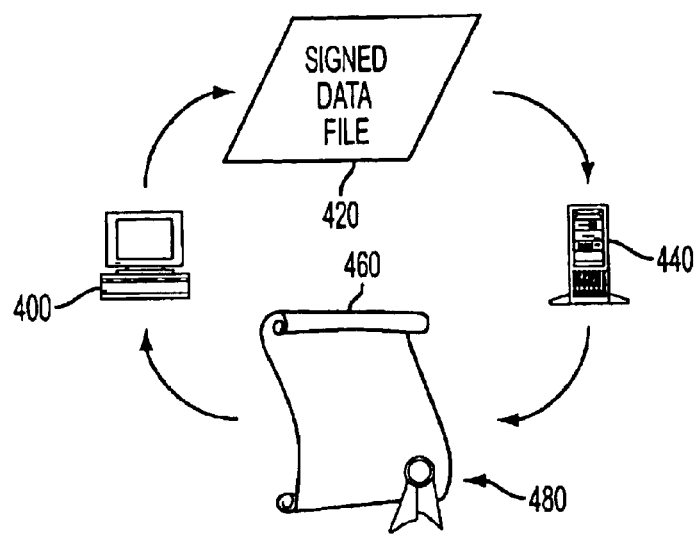
FIG. 4 is a block diagram, which illustrates a conventional digital time-stamping service.
Figure 5:
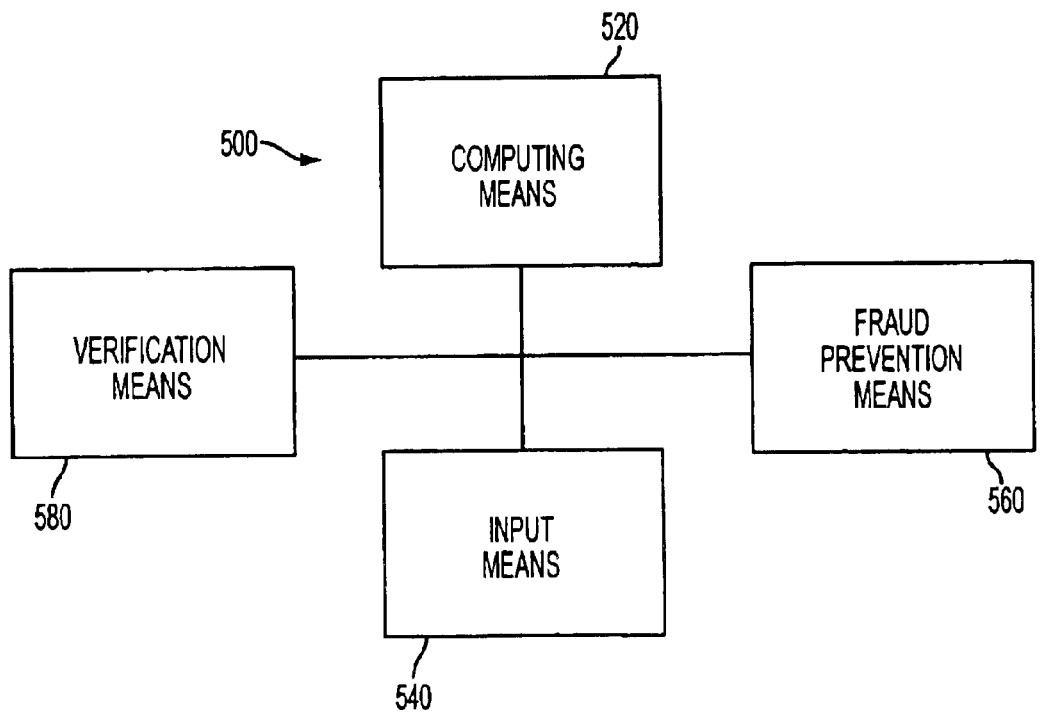
FIG. 5 is a block diagram, which generally illustrates the system according to the present invention.

A system 500 according to the present invention is shown generally in FIG. 5. System 500 suitably comprises a computing means 520, an input means 540, and a fraud prevention means 560, each of which is operatively coupled together. Computing means 520 more specifically comprises a general-purpose computer, such as a personal computer (PC). Input means 540 more specifically comprises any conventional means of inputting digital data to a PC such as a keyboard, a mouse, a touchpad, etc.

Suitable such keyboards include those of the type manufactured by Key Tronic Corporation, Spokane, Wash., U.S.A., and sold under the trademark Lifetime™. These include the Lifetime Classic™, a standard 104-key keyboard adapted for use with PS/2 or AT-style keyboard ports; the Lifetime Classic Wireless™, a battery-operated standard keyboard adapted for use with PS/2 or AT-style keyboard ports through infrared means; the Lifetime Trackball™ and Lifetime Trackball Wireless™, both of which are standard keyboards with an integrated trackball mechanism; and, the Lifetime Touchpad™ and Lifetime Touchpad Wireless™, both of which are standard keyboards having an integrated touchpad.

Other suitable input means 540 include those of the type manufactured by Interlink Electronics, Camarillo, Calif. U.S.A., which employ Versapad® and Versapoint® technologies. These include the Model VP9000 ePad™, a semiconductive touchpad and pen input pad that combines the functionalities of a PC touchpad pointing device and a WinTab-compatible graphics digitizer tablet; the DeskStick™ stationary desktop mouse; the RemotePointPLUS™ cordless, programmable mouse; and the FreedomWriterPRO™, a wireless, "all in one" PC input device that replaces pen, mouse, and keyboard for Internet conferencing, group meetings and presentations.

Computing means 520 and input means 540 together, thus, provide a system for creating a digital data file (not shown in FIG. 5). The digital data file is initially created by the computing means 520, either: (1) by entry of data through the input means 540; or, (2) storage of data in the computing means 520. Such storage of data in the computing means 520 may be accomplished through any number of conventional avenues (e.g., e-mail, downloading the digital data file from an Internet website, ftp transfers, and transfers by way of removable media, such as magnetic media including floppy disks, "Super Disks", Clik! ™, Zip™ and Jaz™ disks (all of which are trademarks of Iomega Corporation, Roy, Utah, U.S.A.); optical media, such as CD-ROM, CD-R, CD-RW and DVD; magneto-optical media, etc.).

In the event that a user (not shown) of the computing means 520 locally creates the digital data file, such digital data file would subsequently be saved at a moment in time. Fraud prevention means 560 is used, according to a particularly important aspect of the present invention, to secure the digital data file by maintaining its integrity in the following manner. An unalterable time-stamp is affixed to the digital data file by fraud prevention means 560 by way of computing means 520. Such a time-stamp may thereafter be used to confirm the date and time associated with any access, creation, modification, receipt, or transmission of the digital data file.

Figure 6:
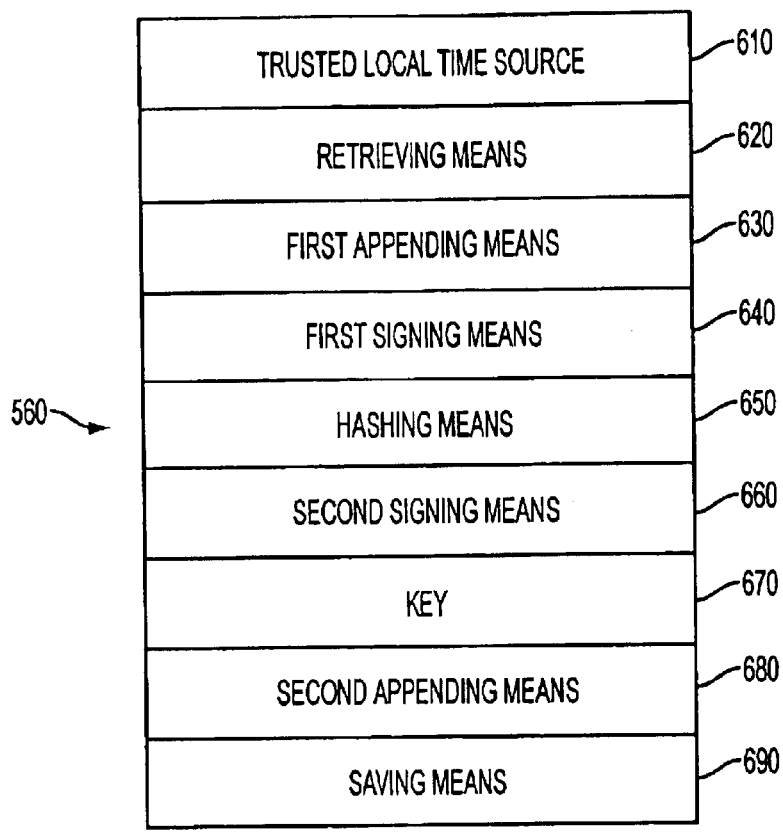
FIG. 6 is a block diagram, which more specifically illustrates the system shown in FIG. 5.

Two alternative embodiments of the present invention will now be described herein after in greater detail with reference to FIGS. 8–11. However, as shown in FIG. 6, fraud prevention means 560 generally comprises a trusted, local time source 610, means 620 for retrieving from that local time source 610 a date and a time corresponding to the moment in time that the digital data file was accessed, created, modified, received, or transmitted; means 630 for appending the date and the time retrieved from the trusted time source 610 to the saved digital data file; means 640 for signing the saved digital data file with the date and the time retrieved from the trusted time source 610 appended thereto; means 650 for hashing the signed digital data file to produce a digest; means 660 for signing the digest with a key 670 to produce a certificate; means 680 for appending the certificate to the saved digital data file; and means 690 for saving the digital data file with the certificate appended thereto.

Figure 7:
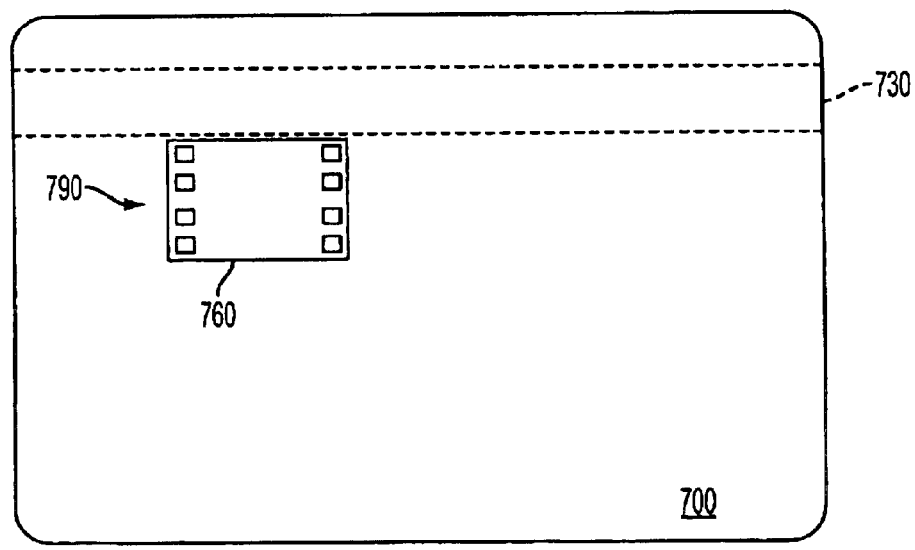
FIG. 7 illustrates a conventional integrated circuit card, or "smart card", which is useful in systems according to the present invention to implement those methods of proving dates in digital data files in accordance with presently preferred embodiments of the invention described herein.

Referring now to FIG. 7, there is shown a conventional integrated circuit card (ICC), more commonly referred to as a "smart card" 700, which typically comprises a credit card-sized plastic case with a magnetic stripe 730 and an embedded microprocessor chip 760. Such known smart cards 700 come in two basic formats: (1) a contact-type including a plurality of electrical contacts 790, which are connected to various pins on the microprocessor chip 760, and embedded in the surface of the plastic case; and (2) a contactless type. The following description in regards to FIGS. 8 and 9 deals with the former contact-type smart card 700, as is defined by the ISO/IEC 7816 joint standards published by the International Organization for Standardization and the International Electrotechnical Commission, the contents of which are incorporated herein by reference.

Figure 8:
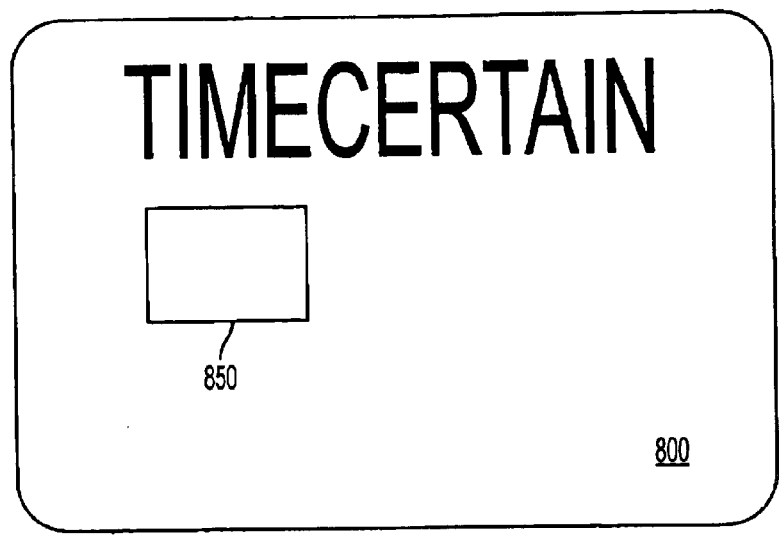
FIG. 8 shows a more specific embodiment of the present invention in a first smart card format.
Figure 9:
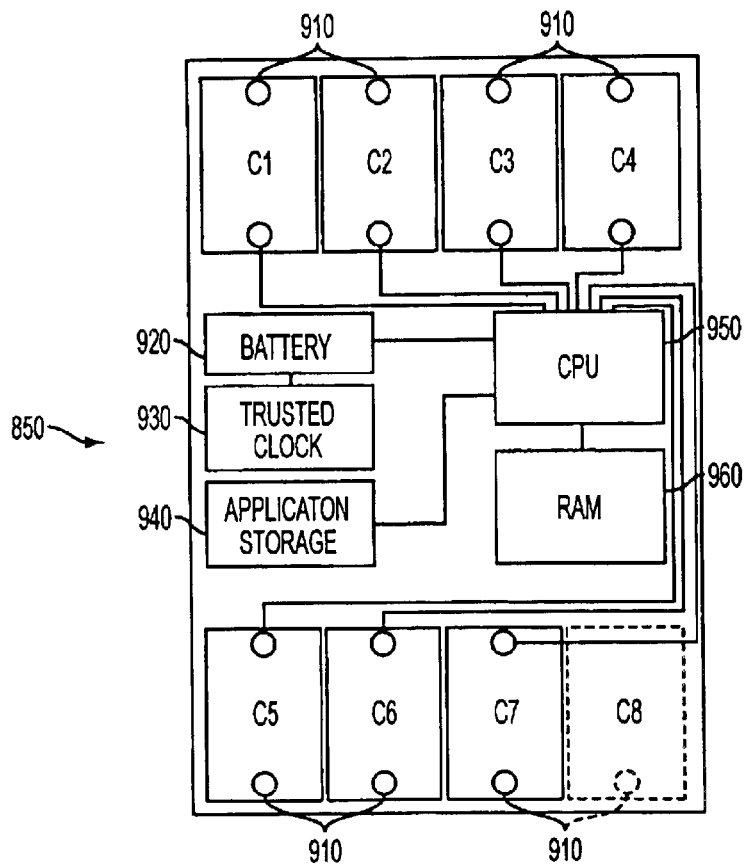
FIG. 9 illustrates a block diagram of the smart card format shown in FIG. 8.

A first smart card format according to the present invention is shown in FIGS. 8 and 9. As shown in FIG. 8, smart card 800 comprises a contact-type smart card with a microprocessor chip 850 embedded therein. A block diagram of the microprocessor chip 850, including its plurality of contacts 910, is shown in FIG. 9.

All of the contacts 910 on smart card 800 comply with ISO/IEC 7816-2 and ISO/IEC 7816-10. Accordingly, contact 910 designated C1 is adapted to provide a supply voltage ($V_{CC}$); contact 910 designated C2 is adapted to provide a reset (RST) signal; contact 910 designated C3 is adapted to provide a clock (CLK) signal; contact 910 designated C4 is adapted to provide a function code (FNB) signal for synchronous cards type 2; contact 910 designated C5 provides a ground (GND); contact 910 designated C6 has been reserved, but is adapted to provide a programming voltage $V_{PP}$; contact 910 designated C7 is adapted for input and output (I/O) of data; and contact 910 designated C8 has been reserved for future use.

Smart cards 800 which require an external programming voltage do would necessarily fall within the scope of the present invention. Hence, C6 need not be physically present. If present, it must be electrically isolated from the integrated circuit and other contacts on the smart card 800. Similarly, since C4 is optional for type 2 synchronous cards, it need not be physically present if its corresponding reader does not support synchronous cards. If C4 is present and the reader does not support synchronous cards, it too must be electrically isolated from the integrated circuit and other contacts on the smart card 800. C8 is reserved for future use. Therefore, it also need not be physically present. If present, it too must be isolated from the integrated circuit and other contacts on the smart card 800.

However, while C8 need not be physically present and must be isolated from the other contacts if present, it may provide a means to input an encoded time-certain date and time in accordance with the present invention. The encoded date and time input may, alternatively, be made directly through C3, the CLK input.

In accordance with another important aspect of the present invention, microprocessor chip 850 further comprises a battery 920, a trusted clock 930, means for storing an application program 940, a central processing unit (CPU) 950, and random access memory (RAM) 960. A contactless smart card 1000 is shown in greater detail in FIGS. 10 and 11.

Figure 10:
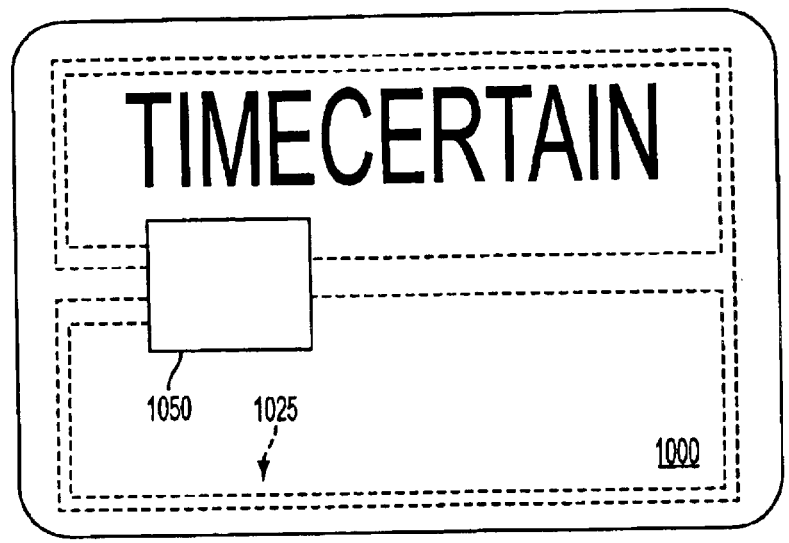
FIG. 10 shows another more specific embodiment of the present invention in a second smart card format.
Figure 11:
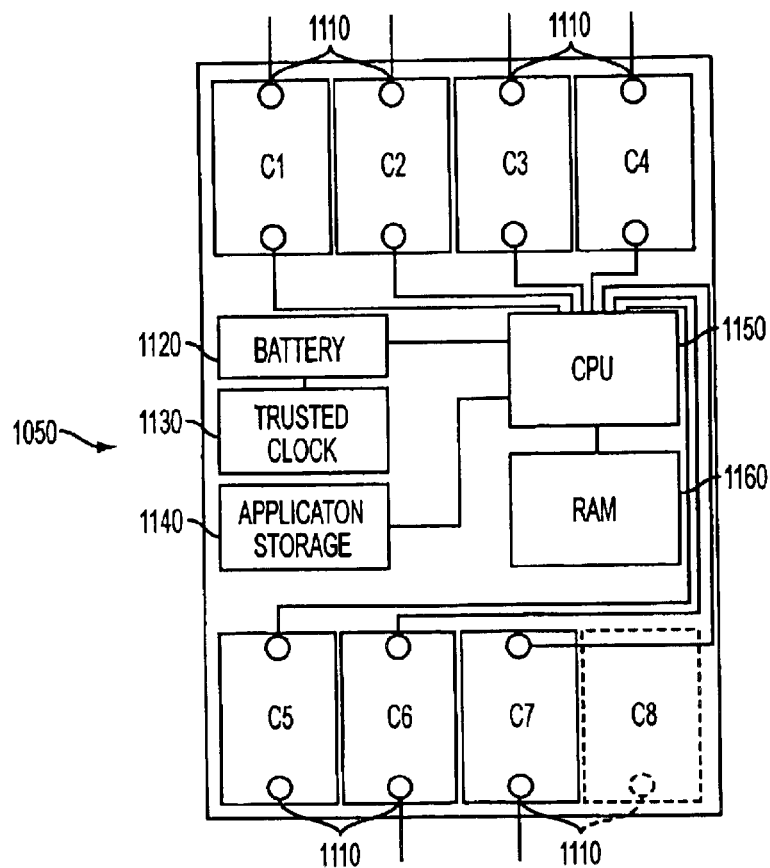
FIG. 11 illustrates a block diagram of the smart card format shown in FIG. 10.
Figure 12:
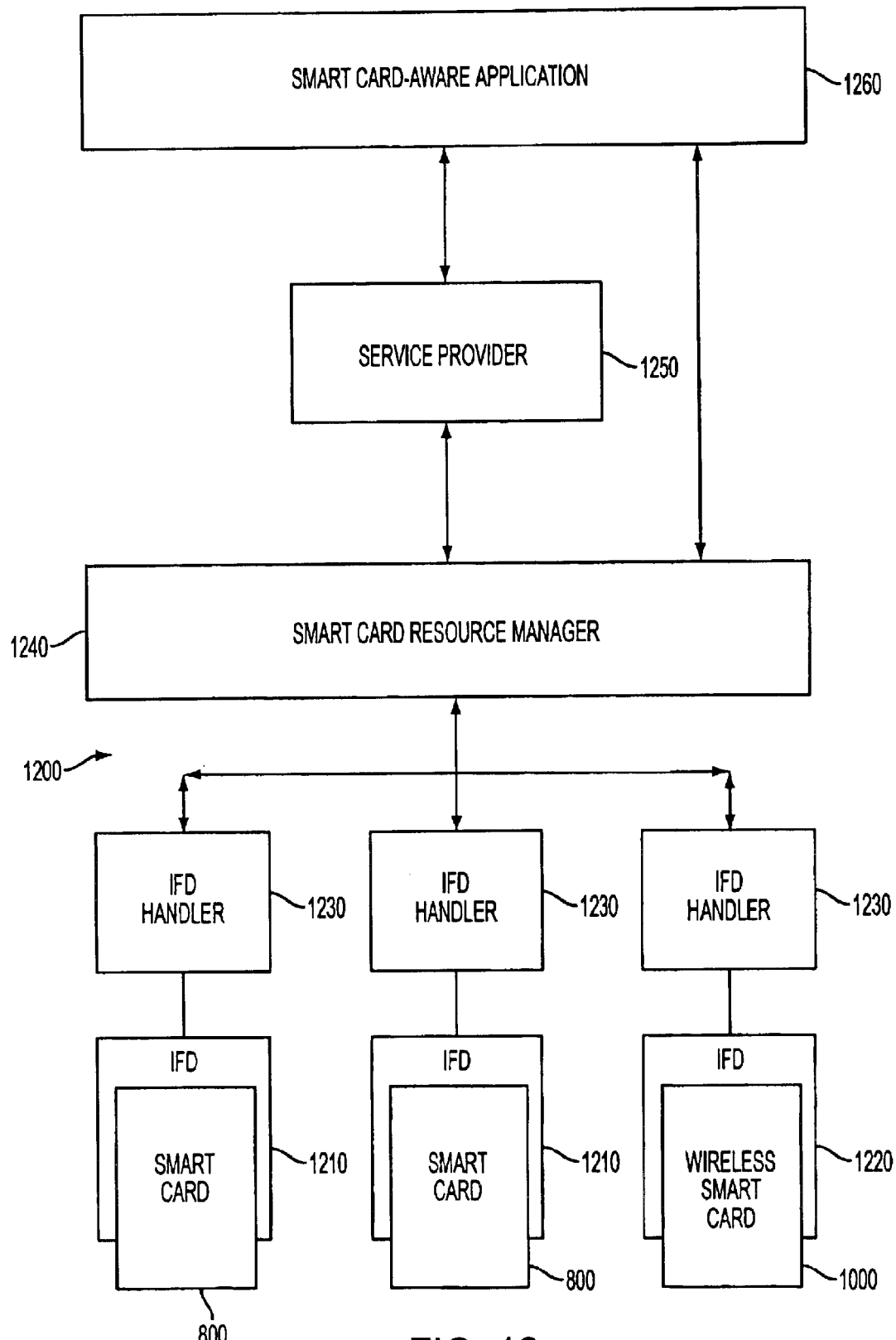
FIG. 12 shows a block diagram of a system incorporating the smart cards shown in FIGS. 8–11.

Referring for the moment to FIG. 12, there is shown a simplified block diagram of a system incorporating the smart cards shown in FIGS. 8–11. Smart cards 800 are inserted within, and smart card 1000 is placed within wireless communication of, a compatible interface device (or IFD 1210, 1220, commonly called a "smart card reader"). IFD 1210 (i.e., for a contact-type smart card 800) need only implement contact arms for its defined smart card 800 contact pads. Implementation of the contact arms for C4, C6, and C8 is optional. However, it should be noted that: (1) to the extent any of the otherwise optional contact arms are present in a smart card 800 according to the present invention; and (2) such optional contact arms are not used in the context of the ISO/IEC standards, they must be electrically isolated from the other contact arms and electronics with the IFD 1210.

The force exerted by the contact arms on the smart card 800 contact pad should not exceed 0.6 N, and need only provide an electrical connection between the IFD 1210 and the smart card 800 itself. Power may thereby be provided by the IFD 1210 through these electrical connections to the microprocessor chip 850. Similarly, an I/O channel is established by these electrical connections allowing the movement of binary information between the IFD 1210 and the smart card 800. Such other physical and electrical requirements of smart card 800 are set forth in the ISO 7816-1, 7816-2, and 7816-3 standards. Moreover, smart cards 800 that are compliant with the ISO 7816-10 draft specification for synchronous cards can be supported by the present invention. These standards not only provide a detailed definition of the physical form factor of smart card 800, but also set forth its electrical characteristics. Accordingly, they are incorporated herein by reference.

Interface Device

An IFD 1210, 1220 is the physical interface device through which smart card 800, 1000 communicates with a PC (not shown). For example, IFD 1210 establishes the set of electrical connections with the embedded microprocessor 850 of smart card 800 through electrical contact pads 910 on the surface of the smart card 800. Through these electrical connections, the IFD 1210 provides DC power to the microprocessor chip 850. Also through these electrical connections, the IFD 1210 provides a clock signal, which is used to step the program counter of the microprocessor, as well as an I/O line through which digital information may be passed between the IFD 1210 and the smart card 800.

An IFD 1210 may use a variety of physical access ports to the PC. Typically, these will be the keyboard port, a serial line port, a PC Card (PCMCIA) port, or a Universal Serial Bus (USB) port. IFDs 1210, 1220 vary widely in their implementations, allowing vendors to make tradeoffs between intelligence embedded within the device itself and within IFD Handler 1230 software in the PC. For the most simple of devices, IFD 1210 need only provide the capacity for electrical connectivity and I/O signal passing between the smart card 800 and the PC. In more complex configurations, IFD 1210 may support the data link layer protocols defined in the ISO 7816-3 standards.

Interface Device Handler

IFD Handler 1230 comprises the PC software necessary to map the native capabilities of the IFD 1210 to the IFD Handler 1230 interface defined herein after. This is typically low-level software within the PC that supports the specific I/O channel used to connect the IFD 1210 to the PC and provides access to specific functionality of the IFD 1210. The differences between "smart" IFD 1210s and "dumb" IFD 1210s are hidden at the IFD Handler 1230 API. This is the layer of the ISO/IEC standards, which is primarily responsible for facilitating interoperability between different IFD 1210s.

The IFD Handler 1230 is the terminus (i.e., on the PC side) of the ISO 7816-3 defined smart card 800 communication protocols (T=0, T=1), and the synchronous protocol specified by the ISO 7816-10 draft specification. At the IFD Handler 1230 API, all distinctions between smart card 800s based on ISO protocol handling, whether synchronous or asynchronous, are hidden.

Smart Card Resource Manager

The smart card resource manager 1240 is a key component of the smart card architecture. It is responsible not only for managing other smart card-relevant resources within system 1200, but also for supporting controlled access to IFD 1210s and, through them, individual smart card 800s. Smart card resource manager 1240 is assumed to be a system-level component of the architecture. It must be present and will most likely be provided by the operating system vendor. There should be only a single smart card resource manager 1240 within a given system 1200.

The smart card resource manager 1240 solves three basic problems in managing access to multiple IFD 1210s and smart card 800s. First, it is responsible for identification and tracking of resources, including: (1) tracking the installed IFD 1210s and making this information accessible to other applications; (2) tracking known smart card 800 types and their associated service provider 1250 and supported interfaces, and making this information accessible to other applications; and (3) tracking smart card 800 insertion and removal events to maintain accurate information on available smart card 800s within the IFD 1210s. Second, it is responsible for controlling allocation of IFD 1210s and resources and, hence access to smart card 800s, across multiple applications. This is accomplished by providing mechanisms for attaching to specific IFD 1210s in shared or exclusive modes of operations. Finally, the smart card resource manager 1240 supports transaction primitives on access to services available within a given smart card 800. This is extremely important, as current smart card 800s are single-threaded devices, which often require execution of multiple commands to complete a single function. Transactions allow multiple commands to be executed without interruption, ensuring that intermediate state information is not corrupted.

Service Provider

Service provider 1250 is responsible for encapsulating functionality exposed by a specific smart card 800 and making it accessible through high-level programming interfaces. The present invention defines programming interfaces for commonly exposed functionality such as file access, authentication, and cryptographic services. These interfaces may be conveniently enhanced and extended to meet the needs of specific application domains.

While shown as a single element, the service provider 1250 is virtually comprised of two independent components—a smart card service provider and a cryptographic service provider. They may logically be thought of as a single component, but they are distinct in recognition of the realities of dealing with existing international export and/or import laws for cryptographic devices. Only those smart card 800s that expose cryptographic functionality, accessible to programs running within the PC, need to develop a cryptographic service provider.

An important point to note is that there is no requirement that a service provider 1250 be a monolithic component running on a single PC. In particular, one can envision building a service provider 1250 as a client/server component. This would allow a server-side application developer to take advantage of the high-level interfaces and interoperability supported by this architecture. It should be noted that some smart card applications require secure messaging for confidentiality and integrity of data moving between an application and the smart card 800. The above implementation can ensure that secure messaging is done within a protected server security perimeter.

In operation, an application may know a priori which service provider 1250 it wants to work through. It can, therefor, connect to the service provider 1250 and wait until the proper smart card 800 is inserted. However, an application may also determine which service provider 1250 to use at run time by using the smart card resource manager 1240 to enumerate available providers and their supported interfaces. This provides flexibility to developers, and meet the needs of applications of various types.

The smart card service provider encapsulates access to a specific smart card 800 through high-level programming interfaces. It should not expose cryptographic functions to applications on the PC. However, it may expose interfaces that use cryptography internal to the smart card 800, such as secure messaging or cryptogram-based authentication.

Before any given smart card service provider can be used within the architecture of system 1200, it must be "introduced" to the smart card resource manager 1240. Typically, this is done through a smart card setup utility provided by the vendor of the smart card 800. The utility provides four pieces of information about the card: (1) its ATR string and a mask to use as an aid in identifying the smart card 800; (2) an identifier for service provider 1250(s) that support the smart card 800; (3) a list of smart card interfaces supported by the smart card 800; and (4) a "friendly name" for the smart card 800 to be used in identifying the smart card 800 to the user. More often than not, the user supplies this to the setup utility.

The cryptographic service provider encapsulates access to specific smart card cryptographic functionality through high-level programming interfaces. It should expose only cryptographic functions to PC applications. Other functionality should be implemented in a smart card service provider 1250.

Interfaces are defined in the present invention for general-purpose cryptographic services including: (1) key generation; (2) key management; (3) digital signatures; (4) hashing (or message digests); (5) bulk encryption services; and (6) key import/export.

Smart Card-aware Application

Smart card-aware applications ("Applications") 1260 are arbitrary software programs within the PC operating environment. Typically, they want to make use of the functionality provided by one or more smart card 800s. It should be assumed Application 1260 is running as a process within a multi-user, multiprocess, multiple-threaded, and multiple device environment. This architecture, thus, provides mechanisms to map PC application requests to the smart card 800, which is typically a single user, single-threaded, but multiple application environment. It can also be presented, in the alternative, as a peer-to-peer communication protocol.

In order to support the above-described architecture, the host PC system is assumed to provide: (1) a general purpose operating system (O/S) environment that supports (a) multiple concurrent processes, (b) process separation at the kernel level, (c) a shared library mechanism to facilitate code reuse and dynamic linking to shared code, (d) asynchronous event/messaging support, (e) an interprocess communication facility, and (f) a memory management facility; and (2) support for third party peripheral devices to include: (a) installable peripheral devices, and (b) the ability to support multiple devices of a given type.

Smart Card Insertion and Removal

The ISO/IEC standards are compatible with IFD 1210s with either manual or automated insertion/removal mechanisms. It is recommended, however, that IFD 1210s position the smart card 800 such that it is always accessible to the card owner. If the IFD 1210 draws the smart card 800 inside, there must be a mechanism provided to return the smart card 800 to the card owner in the event of failure, such as power loss. Simple manual insertion/removal mechanisms are recommended. For reliability, a "landing card" or "landing contact" IFD 1210 socket design is recommended, because "wiping contact" designs are far more likely to damage smart card 800 contacts and/or mar graphics imprinted on the smart card 800. IFD 1210s must also be designed to insure that any location guides, clamps, rollers, etc. will not damage smart card 800, particularly in the areas reserved for optional magnetic stripe and embossing areas.

Electrical Interface Requirements

IFD 1210s according to the present invention must meet ISO/IEC 7816 electrical interface requirements for smart card terminal devices. All electrical measurements are made at the point of contact between the smart card 800 contact pad 910 and the IFD 1210 contact arm. Measurements are defined with respect to the ground contact (i.e., CS) over an ambient temperature range of 0° to 50° C. All currents flowing out of the WFD 1210 are defined as positive.

I/O Connection

Contact C7 supports a half-duplex, serial data link between the smart card 800 and IFD 1210. Both devices must support the ability to selectively set their I/O line driver to transmission or reception mode. Unless transmitting, the I/O line driver must be set to reception mode.

During operation, both devices should never be in transmit mode at the same time. Should this occur, the state of the I/O contact will be indeterminate and no damage should occur to either evice. When both the IFD 1210 and smart card 800 are in reception mode, the contact must be in he high state. The IFD 1210 must incorporate a pull-up resistor to insure that this is the case. IFD 1210 must not pull I/O high unless VCC is powered and stable within tolerances, and it should limit the current flowing into or out of the I/O contact to ±5 mA at all times.

When in transmission mode, IFD 1210 sends data to smart card 800 within parameters shown on the following page.

| Symbol | Conditions | Minimum | Maximum |
|---|---|---|---|
| $V_{OH}$ | −20 µA < IOH < 20 µA, VCC = min | 0.8 × VCC | VCC |
| $V_{OL}$ | −1 mA < IOL < 0 mA, VCC = min | 0 V | 0.3 V |
| $t_r$ and $t_f$ | CIN = 30 pF max | — | 0.8 µs |
| Undershoot and Overshoot | — | −0.25 V | VCC + 0.25 V | where $t_r$=rise time between 10% and 90% of signal amplitude and $t_f$= fall time between 90% and 10% of signal amplitude. When in reception mode, IFD 1210 must correctly interpret signals from smart card 800 within the following parameters.

| Symbol | Minimum | Maximum |
|---|---|---|
| $V_{IH}$ | 0.6 × $V_{CC}$ | $V_{CC}$ |
| $V_{IL}$ | 0 V | 0.5 V |
| $t_r$ and $t_f$ | — | 1.2 µs |

When in transmission mode, smart card 800 must send data to IFD 1210 within the following parameters.

| Symbol | Conditions | Minimum | Maximum |
|---|---|---|---|
| $V_{OH}$ | −20 µA < IOH < 20 µA, $V_{CC}$ = min | 0.7 × $V_{CC}$ | $V_{CC}$ |
| $V_{OL}$ | 0 < IOL < 1 mA, VCC = min | 0 V | 0.4 V |
| $t_r$ and $t_f$ | CIN = 30 pF max | — | 1.0 µs |

When in reception mode, smart card 800 must correctly interpret signals from IFD 1210 within the following parameters.

| Symbol | Minimum | Maximum |
|---|---|---|
| $V_{IH}$ | 0.7 × $V_{CC}$ | $V_{CC}$ |
| $V_{IL}$ | 0 V | 0.8 V |
| $t_r$ and $t_f$ | — | 1.0 µs |
| Overshoot and Undershoot | −0.3 V | $V_{CC}$ + 0.3 V |

Clock

The IFD 1210 should generate a CLK signal (C3) having the following characteristics.

| Symbol | Condition | Minimum | Maximum |
|---|---|---|---|
| $V_{OH}$ | 0 < $I_{OH}$ < 50 µA, $V_{CC}$ = min | $V_{CC}$ − 0.5 V | $V_{CC}$ |
| $V_{OL}$ | −50 mA < $I_{OL}$ < 0, $V_{CC}$ = min | 0 V | 0.4 V |
| $t_r$ and $t_f$ | $C_{IN}$ = 30 pF max | — | 8% of clock period |
| Overshoot and Undershoot | — | −0.25 V | $V_{CC}$ + 0.25 V |

The duty cycle should be between 45% and 55% of the clock period during stable operation. The frequency should be a minimum of 1 MHz with a default frequency in the range of 1 to 5 MHz. IFD 1210 may support a maximum clock frequency(s) greater than 5 MHz. The maximum clock frequency that may be used with any given smart card 800 should be encoded in an ATR string. Use of a CLK frequency above the default should only be initiated by IFD 1210. The CLK should return to the default value any time the smart card 800 activation sequence or smart card 800 reset is initiated. During stable operation, the clock frequency should not vary by more than 1%.

Smart card 800 should operate correctly with a CLK signal as follows.

| Symbol | Conditions | Minimum | Maximum |
|---|---|---|---|
| $V_{IH}$ | — | $V_{CC} - 0.7$ V | $V_{CC}$ |
| $V_{IL}$ | — | 0 V | 0.5 V |
| $t_r$ and $t_f$ | $V_{CC}$ in valid range | — | 9% of clock period |
| Overshoot and Undershoot | — | $-0.3$ V | $V_{CC} + 0.3$ V |

Reset

IFD 1210 should generate an RST signal (C2) having the following characteristics.

| Symbol | Conditions | Minimum | Maximum |
|---|---|---|---|
| $V_{OH}$ | $0 < I_{OH} < 50$ μA, $V_{CC} = $ min | $V_{CC} - 0.5$ V | $V_{CC}$ |
| $V_{OL}$ | $-50$ μA $< I_{OL} < 0$, $V_{CC} = $ min | 0 V | 0.4 V |
| $t_r$ and $t_f$ | $C_{IN} = 30$ pF max | — | 0.8 μs |
| Overshoot and Undershoot | | $-0.25$ V | $V_{CC} + 0.25$ V |

Smart card 800 should correctly interpret an RST signal with the following characteristics.

| Symbol | Conditions | Minimum | Maximum |
|---|---|---|---|
| $V_{IH}$ | | $V_{CC} - 0.7$ V | $V_{CC}$ |
| $V_{IL}$ | | 0 V | 0.6 V |
| $t_r$ and $t_f$ | | — | 1.08 μs |
| Overshoot and Undershoot | | $-0.3$ V | $V_{CC} + 0.3$ V |

Moreover, smart card 800s will preferably respond to an RST signal using asynchronous active low reset.

Supply Voltage

IFD 1210 should generate the supply voltage $V_{CC}$ (C1) and will be capable of delivering a steady state output current of at least 55 mA while maintaining $V_{CC}$ ±8% VDC within designated limits at any supported CLK frequency. It should also contain protection circuitry to prevent damage occurring to it in the event of short circuits. The power supply should be designed to avoid transients and surges, as measured at the smart card 800, from occurring due to normal operation of the IFD 1210 and associated equipment.

Smart card 800 should be designed to operate correctly with a supply voltage of $V_{CC}$ ±10% VDC and have a maximum current requirement of 100 mA when operating at any supported CLK frequency.

At present, many smart cards are designed to operate with a nominal supply voltage ($V_{cc}$) of 5 VDC, although 3V and lower smart cards are known. As a result, the IFD 1210s according to the present invention should have a method of determining the presence of such devices.

Contact Resistance

Contact resistance as measured across a clean IFD 1210 contact arm and a clean smart card 800 contact pad 910 should be less than 500 mΩ throughout the design lifetime of the devices. See, e.g., the ISO/IEC 10373 standard for appropriate test methods.

Session Management

The following describes the interactions expected to occur between smart card 800 and IFD 1210, from the time smart card 800 is inserted into IFD 1210 until it is removed from the IFD 1210.

An electrical interface between the IFD 1210 and the smart card 800 should not be activated until the IFD 1210 contact arms (not shown) and the smart card 800 contact pads 910 are properly aligned and connected. "Deactivated" would, therefore, be defined as all IFD 1210 contact signals in the L state and $V_{CC} < 0.4$V.

IFD 1210 should be designed to insure that it can detect the smart card 800 after it is seated within about ±0.5 mm of the nominally correct position as defined in the ISO/IIEC 7816-2 standard. Because damage to the smart card 800 can occur from "hot contact" insertion, care should be taken in the design of any "card present" detection system.

Contact activation should occur in the following sequence: (a) RST set to state L; (b) $V_{CC}$ powered; (c) I/O set to reception mode (which can be done before or after CLK is applied, but should be done within 200 cycles of the CLK application); and (d) CLK in stable operation.

The bits passed over the I/O line are framed into characters with each character consisting of 10 bits. Prior to transmission of a character, the I/O line is always in the H state. A character consists of the following bits:

One start bit in state L

Eight data bits, which comprise a data byte

One even parity check bit (the number of 1 bits in the data byte and parity bit must be even)

The ATR byte sequence that is returned by the smart card 800 depends on the transmission protocol(s), control parameter, and identifying information that is supported. In any case, the ATR sequence should adhere to a format defined in the ISO/IEC 7816-3 standard, which is incorporated by reference. The total length of the ATR sequence, excluding the initial character TS, is limited to 32 bytes, and TS and T0 are the only mandatory bytes in the ATR sequence.

ATR byte values are defined herein after. If smart card 800 returns a non-compliant ATR sequence, the IFD 1210 should not reject the smart card 800. Operation should be continued using the default protocol and parameters. This is necessary to allow an ATR to be initially programmed or reinitialized in the event of an error. If smart card 800 does not return an ATR, it means that the smart card 800 is inserted incorrectly, is nonfunctional, or that the smart card 800 is an unsupported type (e.g., a synchronous smart card 800). A "nonfunctional card" message is sent to the smart card resource manager 1240. The smart card resource manager 1240 can then determine how to handle this state. For example, if the system handles only asynchronous smart cards, the card is inserted incorrectly, or is inoperable. If, on the other hand, the system handles synchronous smart cards, the user can be given the option of selecting a method to try to read the smart card 800. Optionally, the IFD 1210 may issue a warm reset in an attempt to obtain a valid ATR sequence (i.e., assuming the initial ATR was somehow corrupted). IFD 1210 should not perform more than one automatic warm reset during the initialization sequence in an attempt to retrieve a valid ATR. This operation may take 0.5 to 2.0 seconds, which could be annoying to a user.

TS: Initial Character

TS provides a bit synchronization sequence and defines conventions for encoding data bytes in all subsequent characters. TS defines one of two possible encoding conventions:

Direct Convention. A high state (H) on the I/O line is interpreted as a logic one, and the least significant bit is transmitted first. This is indicated by the value '3B' or (H)LHHLHHHLLH.

Inverse Convention. A low state (H) on the I/O line is interpreted as a logic one, and the most significant bit is transmitted first. This is indicated by the value '3F' or (H)LHHLLLLLLH. IFD 1210s are required to support both direct and inverse conventions.

T0: Format Character

T0 is interpreted as two 4-bit nibbles. The upper nibble (i.e., bits 5 through 8) is designated Y1. This indicates the presence of optional characters based on a logic one in the following bit positions:

Bit 5 indicates TA1 is present.

Bit 6 indicates TB1 is present.

Bit 7 indicates TC1 is present.

Bit 8 indicated TD1 is present.

The lower nibble (i.e., bits 1 through 4) is designated K and is interpreted as a numeric value in the range zero through 15. It indicates the number of historical characters present.

TAi, TBi, TCi, TDi: Interface Characters

These characters, if present, are used to determine data communications parameters and protocols. The presence of these characters when i=1 is determined by Y1 (encoded in T0). Their presence when i>1 is determined by the value of Yi, which is encoded in TDi−1. They are interpreted as follows:

TA1. Encodes FI in the upper nibble (bits 5 through 8) and DI in the lower nibble (bits 1 through 4). These are used to determine the clock conversion factor (F) and bit rate adjustment factor (D), and maximum supported clock rate according the tables below.

| FI | 0000 | 0001 | 0010 | 0011 | 0100 | 0101 | 0110 | 0111 |
|---|---|---|---|---|---|---|---|---|
| F | Internal Clock | 372 | 558 | 744 | 1116 | 1488 | 1860 | RFU |
| $f_{max}$ (MHz) | — | 5 | 6 | 8 | 12 | 16 | 20 | — |
| FI | 0000 | 1001 | 1010 | 1011 | 1100 | 1101 | 1110 | 1111 |
| F | Internal Clock | 512 | 768 | 1024 | 1536 | 2048 | RFU | RFU |
| $f_{max}$ (MHz) | — | 5 | 7.5 | 10 | 15 | 20 | — | — |
| DI | 0000 | 0001 | 0010 | 0011 | 0100 | 0101 | 0110 | 0111 |
| D | RFU | 1 | 2 | 4 | 8 | 16 | 32 | RFU |

-continued

| DI | 1000 | 1001 | 1010 | 1011 | 1100 | 1101 | 1110 | 1111 |
|---|---|---|---|---|---|---|---|---|
| D | 12 | 20 | ½ | ¼ | ⅛ | 1/16 | 1/32 | 1/64 |

TB1, TB2. These are used to encode information concerning the programming voltage and programming current factor. It is recommended that compliant smart card 800s set TB1='00' to indicate $V_{PP}$ is not required, and not transmit TB2. If a smart card 800 returns a nonzero value of TB1 or TB2, the IFD 1210 should not reject the smart card 800 and should continue as though values of '00' were returned.

TC1. This is interpreted as an 8-bit unsigned integer, which represents N, the extra guard time required between characters. The IFD 1210 is required to wait 12+N etus between the leading edge of the start bit of a character and the leading edge of the start bit of the subsequent character. If N=255, then the minimum delay time is set to 11 etus. In the absence of the above characters, the implicitly defined values are: F=372; D=1; I=50; p=5; N=0.

TD1. This encodes Y2 in the high nibble as indicated previously. The low nibble encodes the protocol type, T, which is interpreted as an unsigned integer in the range zero through 15. If TD1 is not present, then T=0 is used implicitly. If TD1 is present, then the protocol indicated is the default protocol. If T=0 is one of the supported protocols, then it should be specified as the protocol type in TD1.

The only protocol types which are presently preferred are: (1) T=0. Asynchronous half-duplex character-oriented protocol; (2) T=1. Asynchronous half-duplex block-oriented protocol; and (3) Synchronous. IFD 1210s may reject smart cards that explicitly specify any other default protocol type.

TA2. If absent, this indicates that smart card 800 is in the negotiable mode of operation. It is recommended that smart cards according to the present invention not return TA2. If TA2 is present, it indicates a specific mode of card operation. Information is encoded as follows:

Bit 8. If zero, smart card 800 can change mode of operation. If one, smart card 800 is unable to change.

Bits 6 and 7. RFU.

Bit 5. If zero, parameters are defined by interface characters. If one, parameters are implicitly defined.

Bits 1 through 4. Protocol type, T.

TC2. This is specific to T=0 and defines the work waiting time integer (WI), which defines the maximum interval between the leading edge of the start bit of any character sent by the smart card 800 and the leading edge of the start bit of the previous character sent by either the smart card 800 or the IFD 1210. W=960×D×WI. It is recommended that compliant smart card 800s not return TC2 and use the default WI=10.

TDi where i>1. This indicates whether subsequent interface characters are present and the protocol type using the encoding defined for TD1.

TAi where i>2. This is used only for T=1 and encodes the value of the Information Field Size for the Card (IFSC). This is the largest amount of information that the smart card 800 can accept in a single block. The default value is 32, with legal values being in the range 1 through 254.

TBi where i>2. This is used only for T=1 and encodes the value of the character waiting time integer (CWI) in the low order nibble and the block waiting time integer (BWI) in the high order nibble. The character waiting time (CWT) is the maximum time between the leading edges of two consecutive characters in the same block. The default value of CWI is 13. The block waiting time (BWT) is defined as the maximum time between the leading edges of the last character that gave the right to send to the card and the first character sent by the card. The default value for BWI is 4 and should not be larger than 9.

TCi where i>2. Bit 0 indicates use of CRC error detection if set to one and LRC error detection if set to zero. All other bits should be set to zero.

T1 to TK: Historical Characters

If K (encoded in T0) is not null, then the ATR sequence will include K "historical characters." The definition of these characters is provided in ISO/IEC 7816-4: 1995 (E), Section 8, which is incorporated herein by reference. It is recommended that any smart card 800 encode an identification number in these characters.

Requirements

TCK: Check Character

TCK is a checksum character computed such that performing a bit-wise XOR operation on all bytes in the ATR from T0 through TCK is null. In the event that only the T=0 protocol is indicated by the ATR sequence, TCK shall not be sent.

Protocol Negotiation

IFD 1210 shall support implicit protocol type selection as defined in ISO/IEC 7816-3. To make an implicit protocol selection, they merely continue to use the default protocol and timing parameters. An IFD 1210 may optionally support the ability to explicitly select from among the smart card 800 offered protocols and parameters using the protocol Type Selection (PTS) procedure defined in ISO/IEC 7816. The PTS request and response consist of a byte sequence as shown below.

PTSS Initial character
PTS0 Format character
PTS1 parameter characters
PTS2
PTS3
PCK Check character PTSS. Identifies the PTS request/response and is coded as 0xFF.

PTS0. Bits 5, 6, and 7 indicate the presence of the parameter bytes PTS1 through PTS3, respectively. The low-order nibble encodes the protocol type in the same manner as the TD1 bytes.

PTS1. Encodes F1 and D1 in the same manner as TA1. These values should lie in the range between the default values and those indicated in TA1. If PTS1 is not sent, then the default values are assumed. In the response, the smart card 800 echoes PTS1 to acknowledge these values or does not send PTS1 to indicate defaults should be used.

PTS2 and PTS3 are both reserved for future use. As such, they may also be a point by which an encoded time-certain date and time is entered into systems and apparatus according to the present invention.

PCK. Checksum generated such that performing a bit-wise XOR operation on all bytes from PTSS through PCK is null.

Negotiation is successful if the response echoes the request or the response selectively does not echo PTS1, PTS2, or PTS3 and zeros the associated indicator bit in PTS0. All other responses indicate failure. The new protocol and/or parameters shall be used following a successful PTS exchange.

Deactivation Sequence

At the end of a session, or upon abnormal session termination (unresponsive smart card 800 or detection of smart card 800 removal), the smart card-800 contacts shall be deactivated in the following sequence:

RST set to state L
CLK set to state L
I/O set to L
$V_{CC}$ set to inactive (<0.4 VDC)

Data Communications Protocol Support

210 should also be compatible with all ISO/IEC 7816-3 data communications protocol specifications: T=0 and T=1. All supported protocols are assumed to use the same physical layer and character framing rules. The following details the data link and transport layers in terms of specific requirements for compliant devices. In particular, it describes the level of protocol support and error handling expected of the IFD 1210 and the protocol support implemented at the service provider layer.

All data exchanged using the T=0 or T=1 protocols is assumed to represent 8-bit, binary quantities. Specific options related to implementation of T=0 or T=1 protocols are set forth below.

Bit and character timing shall be consistent with the ISO/IEC 7816 standard and reflect valid timing options for smart card 800 and IFD 1210. Commands are always initiated from the IFD 1210 to the smart card 800. These commands are generated by an appropriate service provider 1250 within the PC, generally as the result of a request from an application program running in the PC.

IFD 1210 is expected to process Command Transport Data Units (C-TPDU), consisting of command information and associated data, as a single entity. The IFD 1210 initiates a command by sending a 5-byte command header to the smart card 800 containing the following bytes.

CLA 1-byte command class.
INS 1-byte instruction code.
P1 1-byte parameter #1, which is instruction dependent.
P2 1-byte parameter #2, which is instruction dependent.
P3 1-byte indicating the length of data that will be sent to smart card 800, or the length of data expected in response from the smart card 800. This is also instruction dependent.

If the command has associated data, it is transferred subsequently based on the response from the smart card 800.

Following receipt of the command header, the smart card 800 responds with a procedure byte. This is defined as shown in the following table.

| Definition | Value | IFD 1210 Action |
|---|---|---|
| ACK | INS | All remaining data bytes are transferred to the smart card 800, or the IFD 1210 shall be ready to receive all remaining data bytes from the smart card 800. |
|  | $\overline{\text{INS}}$ | The next data byte shall be transferred to the smart card 800, or the IFD 1210 shall be ready to receive the next data byte from the smart card 800. |

-continued

| Definition | Value | IFD 1210 Action |
|---|---|---|
| NULL | 0x60 | The IFD 1210 shall provide additional work waiting time, and wait for another procedure byte from the smart card 800. |
| 'SW1' | 0x6x or 0x9x | The IFD 1210 shall wait for receipt of a second status byte 'SW2' |

The IFD 1210 is not expected to interpret an SW1 byte when received. To insure the broadest possible compatibility, IFD 1210s are not to implement support for SW1 responses as defined in the ISO/IEC 7816-4 standard. This is the responsibility of the associated service provider 1250.

If a command has associated data, the IFD 1210 will send it, or the next byte in the sequence, following receipt of an ACK procedure byte as defined above. After the data has all been transferred to smart card 800, the smart card 800 will respond with an another procedure byte. If an ACK procedure byte is received when no data is remaining to be sent to smart card 800, then implicitly, IFD 1210 assumes the smart card 800 will be sending data to the IFD 1210.

Error Handling

T=0 defines procedures for handling byte parity errors during transmission. Support for these procedures is mandatory and shall be implemented by the IFD 1210 and smart card 800. If a character is received incorrectly, or correctly but with a parity error, the receiver shall indicate an error by setting the I/O line to state L at time 10.5±0.2 etus following the leading edge of the start bit of the character for a minimum of 1 etu and a maximum of 2 etus. The transmitter shall test the I/O line at 11±0.2 etus after the leading edge of the start bit of a character was sent and assumes that the character was correctly received if the I/O line is in state H. If the I/O line is in state L, the transmitter shall wait at least 2 etus and then repeat the character for a maximum of three retries.

T=1 Block Protocol

Bit and character timing should be consistent with the ISO/IEC 7816 standard, and should reflect valid timing options for smart card 800 and IFD 1210. Parity will be checked at the character level. Each block frame is structured as follows, where the Prologue and Epilogue fields are mandatory and the Information field is optional.

| Prologue Field | | | | Epilogue Field |
|---|---|---|---|---|
| Node Address (NAD) | Protocol Control Byte (PCB) | Length (LEN) | Information Field APDU or Control Information (INF) | Error Detection Code (EDC) |
| 1 byte | 1 byte | 1 byte | 0 to 254 bytes | 1 or 2 bytes |

It should be noted that the EDC can be either a 1-byte LRC or a 2-byte CRC. LRC is the default, and is most common. The NAD field may be used to define a logical channel between the IFD 1210 and smart card 800. It is encoded as follows:
Bits 1, 2, and 3 are the Source Node Address (SAD).
Bit 4 is zero.
Bits 5, 6, and 7 are the Destination Node Address (DAD).
Bit 8 is zero.
If node addressing is used, the first block from the IFD 1210 to the smart card 800 will establish the initial logical channel. If node addressing is not used, then SAD and DAD should always be zero. The IFD 1210 will be capable of operating in either mode. If node addressing is used, the SAD and DAD may not be set to the same value.

The PCB defines the type of block being sent and should be one of the following:
Information block (I-block) used to transmit an APDU:
Bits 1 through 5 are RFU.
Bit 6 indicates chaining.
Bit 7 is sequence number.
Bit 8 is zero.
Receive-ready block (R-block) used to indicated acknowledgment:
Bit 8 is one.
Bits 6 and 7 are zero.
Bit 5 is sequence number.
Bits 1 through 4 indicate errors: 0=no errors; 1=EDC and/or parity error; 2=other error.
In the above, the sequence number is a modulo-2 value coded on one bit. The sequence number is maintained independently by the smart card 800 and IFD 1210. The value starts with zero for the first I-block sent after the ATR and is incremented by 1 after each I-block. The sequence number is reset to zero following a resynchronization. For an R-block, the sequence number used is that of the next expected I-block during chaining operations and of the last received block when requesting a block repetition.
Supervisory block (S-block) used to exchange control information:
Bits 7 and 8 are 1.
Bit 6 indicates response if 1, else request.
Bits 1 through 5 indicate type of information: 0=resynchronization request; 1=information field size request; 2=abort request; 3=extension of BWT request; 4=VPP error (not used).
When the INF is present, it can be no larger than the negotiated Information Field Size (IFS). When the IFD 1210 is sending to the smart card 800, the IFS Card (or IFSC) is initially established by TA3 in the ATR sequence. The IFSC size can be renegotiated by the smart card 800 sending an S(IFS request) block to the IFD 1210. When the smart card 800 is sending to the IFD 1210, the IFS Device (IFSD) is initially set to 32. The IFSD can be renegotiated by the IFD 1210 sending an S(IFS request) block to the IFD 1210. To insure maximum throughput, it is recommended that both smart card 800 and IFD 1210 support an IFS of 254 bytes.

It is possible to transmit data that exceeds the IFS. This is done via chaining as described in the ISO/IEC 7816-3 standard, and is accomplished by sending a series of I-blocks with bit 6 in the PCB set to one, indicating that a subsequent block follows. This bit is set to zero in the PCB of the last I-block in the chain. The receiver should acknowledge or reject each block in the chain using an R-block. It is the responsibility of the IFD 1210 and smart card 800 to implement chaining. It is the responsibility of the IFD 1210 to format and transmit the data received from service provider 1250 based on the current IFS setting.

Finally the Epilogue contains the error detection code associated with the block. This can be either a CRC or LRC as negotiated during the ATR sequence. The IFD 1210 shall compute the Epilogue.

Rules for Error Free Operation

Devices compatible with the present invention should observe the following rules. After ATR is complete, the first block transmitted shall be sent by the IFD 1210 and may be either an S-block or an I-block. Whenever transmission of a block is complete, the sender shall switch to the receiving state and await a block from the other devices. After a receiver has read a complete block, per the LEN field, it has the right to send. If node addressing is being used, the node value will be included in the first block sent by the IFD 1210. These values will be used for all subsequent exchanges related to this logical session between the service provider 1250 and the smart card 800. If the IFD 1210 wishes to change the IFSD from the initial value of 32, it will send an S(IFS request) block. It is recommended this be set to 254 and that this be the first block sent by the IFD 1210 to the smart card 800. The IFD 1210 may perform this action independently, but should wait until a service provider 1250 has initiated a logical session so that the node addressing mode may be properly set.

The receiver should acknowledge all I-blocks by sending an appropriate I-block or R-block. R-blocks are used when chaining is in effect. S-blocks are always exchanged in pairs, with an S(request) followed by an S(response).

Error Detection

IFD 1210 should detect the following errors. Transmission error (incorrect parity or an EDC error) or a BWT time-out, Loss of synchronization (wrong number of characters received), Protocol error, AND Abort request for a chain of blocks.

IFD 1210 is responsible for attempting to recover through retransmission of a block or deactivation of the smart card 800 contacts. In the latter case, the IFD 1210 will inform the service provider 1250 that an unrecoverable error has occurred. Smart card 800 is responsible for attempting to recover from errors through retransmission of a block or becoming unresponsive.

Protocol Error Handling Rules

The following rules shall apply when attempting error recovery based on block retransmission. If the first block received by smart card 800 after ATR is invalid it shall return an R-block with bit 5=0. If there is no response from smart card 800 to a block sent by the IFD 1210 within BWT, the IFD 1210 subsystem shall follow the scenario 33 or 35 defined in the ISO 7816-3 standard Annex A document, in order to try to recover the communication. If it fails, the IFD 1210 subsystem shall deactivate the smart card 800 and inform the smart card 800 service provider 1250 that an unrecoverable error has occurred. If an invalid block is received in response to an R-block, the sender shall retransmit the R-block. If an S(response) is not received in response to an S(request), the sender shall retransmit the S(request). If an invalid block is received in response to an S(response) block, the sender shall transmit an R-block with bit 5=sequence number of the next expected I-block. If IFD 1210 has sent a block a maximum of three times in succession, or smart card 800 has sent a block a maximum of twice in succession, without obtaining a valid response, the IFD 1210 may either attempt recovery through an S(Resynch request) or deactivate smart card 800 and inform the service provider 1250 that an unrecoverable error has occurred. If a receiver detects an underrun or overrun condition, it will wait the greater of CWT or BWT before transmitting. An S(Resynch request) may be initiated only by the IFD 1210. If successful, this will resynch smart card 800 and IFD 1210 and reset communication parameters to the initial values. If a valid S(Resynch response) is not received after three attempts, then the IFD 1210 will deactivate smart card 800. When smart card 800 sends an S(IFS request) and receives an invalid response, it will retransmit the block only 1 time to elicit an S(IFS response) and then remain in receive mode. The abortion of an I-block chain may be initiated by either the sender or receiver sending an S(Abort request)

The foregoing assumes compatibility with the ISO/IEC 7186 standard rules for mapping APDUs onto the T=0 or T=1 data link layer protocols. It is the responsibility of smart card 800 and its associated service provider 1250 to perform this mapping. They are also responsible for defining the meaning of all 0x6x and 0x9x response codes and insuring that appropriate processing is performed.

Figure 13:
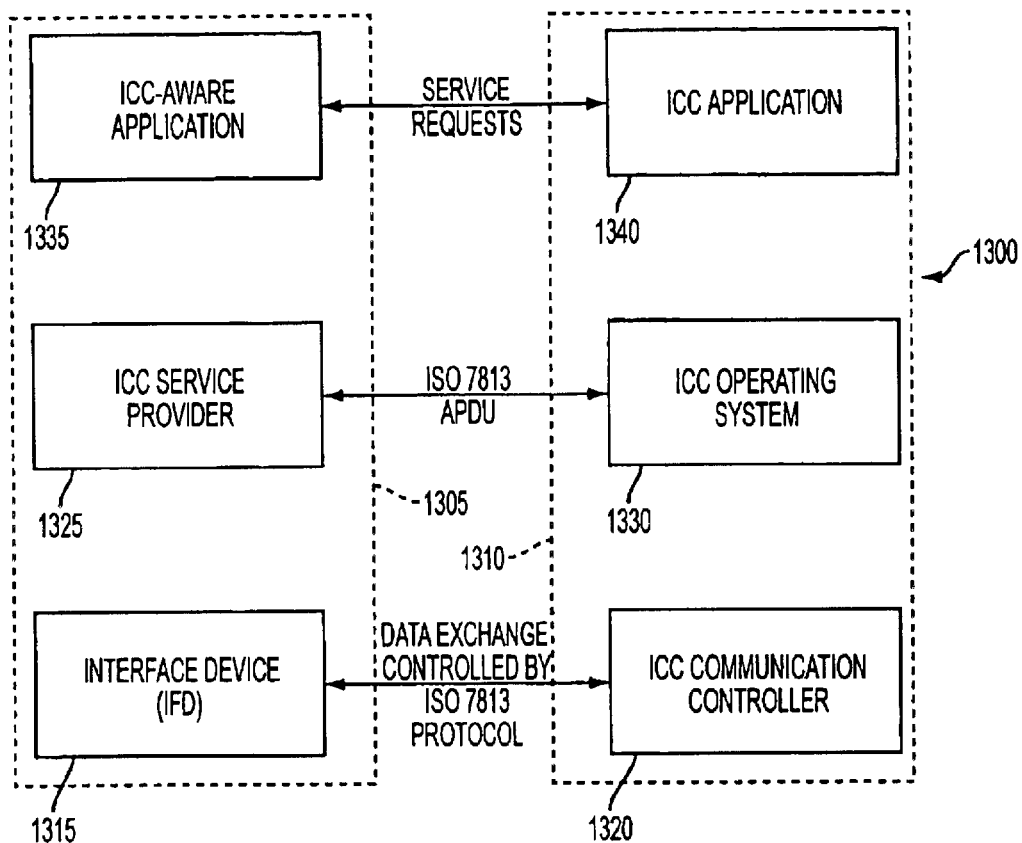
FIG. 13 illustrates a communication protocol for the smart cards and system shown in FIGS. 8–12.

FIGS. 10 and 11 illustrate a contactless smart card 1000 according to the present invention. Smart card 1000 is virtually identical to smart card 800. However, it does not rely on contact arms of the IFD 1220 to provide electrical connections or I/O channels. Instead, it further comprises a wireless antenna 1025, which is coupled to each of the contact pads 1110 to provide equivalent functionality. The communication protocol for smart cards 800, 1000 and system 1200 described herein above is shown in FIG. 13.

Further information regarding such contactless-type smart cards may be found in the ISO/IEC 14443A joint standard entitled "Contactless Integrated Circuit Cards", which is incorporated herein by reference. Suitable sources of such contactless-type components, cards, and readers are Motorola Corporation, SGS-Thomson, and Philips Semiconductors. For example, Philips MIFARE® Architecture Platform provides a compatible family of contactless and dual interface (contact and contactless on a single chip) smart card integrated circuits, based on a single MIFARE reader platform. With well over 2.5 billion card transactions in the last four years, the open MIFARE technology has become the industry standard for contactless smart cards, and is used in an estimated 90% of all contactless schemes. MIFARE smart cards are fully compliant with the above mentioned ISO/IEC 14443A.

Another particularly preferable source for smart card 1000 are those manufactured by EFKON, which is based in Austria. EFKON's IS® (a registered trademark of EFKON) solutions use contactless smart cards based on Philips' MIFARE technology. However, instead of using a radio signal to couple such smart cards to the smart card reader, the EFKON approach uses infrared light, which is free of potential interference problems.

The smart cards 800, 1000 may also be conveniently used within the Microsoft® Internet-Security Framework (MISF). Smart cards used in such a framework can provide tamper-resistant storage for protecting private keys, account numbers, passwords, and other forms of personal information. Smart cards can also serve to isolate security-critical computations involving authentication, digital signatures, and key exchange from other parts of the system that do not have a "need to know." In addition, smart cards provide a level of portability for securely moving private information between systems at work, home, or on the road. Unlike common password protected files on a hard drive, the PINs to a smart card can be auto-disabling, so that a guessing attack is not feasible. The Smart Card for Windows, adapted with the methods according to the present invention, can contain a virtual machine for running custom code, implying that the smart card is a very extensible platform. Smart cards are a key component of the public-key infrastructure that Microsoft is integrating into the Windows® operating system platform because smart cards enhance software-only solutions such as client authentication, single sign-on, secure storage, and system administration. Smart cards in a security system allow for multiple factors of authentication (e.g., biometric data, etc.) Multiple factors offer a big improvement over traditional password systems which only involve the single factor of something the user knows.

Smart cards will typically contain a user's X.509 certificate and the associated private key. The smart card should be used to request the certificate from the CA, by using the Internet Explorer browser. The browser communicates with CryptoAPI which, in turn, communicates with the CSP for the smart card. During the certificate request and download process, a public/private keypair is generated, the private key is stored on the smart card, and the public key is submitted to the CA along with other identifying information such as name and e-mail address. If the authority approves the request, the certificate is returned and stored on the smart card. At no time in this process is the private key submitted to the certificate authority. Ideally, it does not leave the smart card, but that requires a smart card capable of generating quality keys. An alternative to creating certificates one at a time as just described is to use a bulk issuance solution (e.g., Litronic ProFile Manager. This removes the burden of the request process from the end user of the certificate. Certificates in this model can be issued in a centrally managed bulk process on behalf of the users, and any keys that will be used to encrypt data can be securely backed up in case the issued key gets lost. ProFile Manager represents a new type of security solution which can greatly ease adoption of PKI and smart card technologies for stronger authentication in enterprise or internet commerce environments. Enterprise administrators can use such solutions to manage the complexities of issuance and life-cycle management for smart card-based digital certificates.

Smart Card-enabled E-mail Security

Similar to Web security, smart card enabled e-mail security does not require custom programming because much of the code exists in standard products. Outlook and Outlook Express support the S/MIME protocol, which allows for a private keys and certificates to be used for digitally signing and encrypting/decrypting e-mail. Again, it is assumed that a certificate and private key exist on the smart card from a separate enrollment process. The e-mail client communicates with CryptoAPI and the CSP to use the smart card. In the case of a signed e-mail, the e-mail client creates a hash of the message to be signed. The original message, the resultant signature (which is actually an encrypted copy of the hash), and the certificate information are sent to the e-mail recipient. If the recipient trusts the certificate authority who issued the certificate, it creates its own hash of the original message, extracts the senders public key from the certificate, and uses the public key to decrypt the hash signed by the private key. If the two hash values match, the signature is valid, and the recipient knows that the message was indeed sent by the holder of the smart card and that the message did not change at all in transit. In order to encrypt a message, the sender should have a copy of the recipient's certificate. This can be achieved by having received a signed message from them at some point in the past, or retrieving their certificate from a directory such as Active Directory. The encryption process does not necessarily involve the smart card, but the decryption does. In other words, once an e-mail is encrypted, only the recipient's smart card will be able to decrypt it. The sender gets the recipients public key from their certificate. Then a one time, random "session key" is generated and the entire message is encrypted with a symmetric algorithm. This protocol is a good example of combining symmetric and asymmetric cryptography. This session key is then encrypted by the recipient's public key. The wrapped key and the encrypted message are then sent. When the recipient opens the message, the private key on their smart card should be used to decrypt the session key. Then the symmetric session key is used to decrypt the message.

By storing the private keys and certificates of the present invention on smart cards, the same benefits mentioned above in the Web security section will be realized.

Smart Card-enabled Workstation Logon

There are several choices for smart card enabled workstation logon. For example, in Windows 9x, it is not possible to truly secure the login to the Windows 95 and 98 platforms. If a smart card enabled logon is desired, Microsoft Windows NT® 4.0 or Windows 2000 should be used. On the other hand, with Windows NT 4x, smart card enabling the NT4 logon can be done using a shared secret method as shown in the sample application included in the Smart Card for Windows kit. Full source code is included in a sample application provided by Microsoft, which provides exact details of the method. Essentially, the normal GINA DLL is replaced with one that is smart card aware. The user's username, password, and domain are stored on the smart card. At the time of logon, instead of seeing "please enter username and password", the user sees "please insert your smart card". Once the proper PIN to the smart card is presented, the username, password, and domain are extracted from the smart card and sent to the authentication service.

This method has several benefits over normal username/password login. Smart cards can be initialized with a very strong password, which would be difficult for a human to remember. This increases the effective keyspace. The user might not even know what the password is, so that they cannot write it down or share it with others. This reduces the likelihood of unauthorized persons obtaining a copy of the key.

In the Windows 2000 platform, smart cards and certificate based logon are built in. Thus, a public key system is used to logon to the workstation. In this case, the smart card contains the certificate and associated private key. A challenge is sent to the smart card upon request for logon. The private key signs the challenge, and the result and certificate are submitted to the authentication service. The authentication service can verify the signature and do further checks of the certificate from a centralized Active Directory. Used according to the systems and methods of the present invention, there becomes no need for a remote CA.

Smart Card-enabled Dial-up Security

Smart card enabling the RAS dialup client can be done using a shared secret method as shown in the Smart Card for Windows kit. Essentially, the normal Windows RAS dial client is replaced with one that is smart card aware. The user's username, password, and domain are stored on the smart card. At the time of dialup, instead of seeing "please enter username and password", "please insert your smart card" will be seen. Once the proper PIN to the smart card is presented, the username, password, and domain are extracted from the smart card and sent to the authentication service. PPTP can be used to enhance the security of this protocol by encrypting the data that moves across the phone line. This method has several benefits over normal username/password dialup. Smart cards can be initialized with a very strong password, which would be difficult for a human to remember. This increases the effective keyspace. The user might not even know what the password is, so that they can't write it down or share it with others. This reduces the likelihood of unauthorized persons obtaining a copy of the key.

Smart Card-enabled Signing of Active Content

Smart cards can be used in conjunction with Authenticode technology to let end users identify who published a software component and verify that no one tampered with it before downloading it from the Internet. The first step for a developer is to acquire a software publishing certificate for use with Authenticode. When requesting and obtaining this certificate, make sure that the smart card CSP is available to the browser used to request the certificate. This way, the private key and associated certificate will both reside on the smart card. However, this can be done with the systems and method of the present invention on registration. Tools for signing code are available in the ActiveX SDK (MSDN Library, SDK Documentation). Developers can find these tools in the bin directory after installing the ActiveX SDK.

Portable and Secure Storage of Other Data

Because the smart card is an ideal platform for secure and portable storage of small amounts of data, the following examples may be illustrative. Take, for example, encrypting the file system. A symmetric key could be stored on the smart card, whose sole purpose is to encrypt certain files, folders, or partitions of a hard drive. It is very important to have a securely stored backup of the key, in case the smart card becomes lost or damaged. CryptoAPI functionality and the Base Provider allow various symmetric algorithms to be utilized for this purpose. One can imagine a thread process that always runs on the computer, continually checking to see whether or not the proper smart card is inserted. When inserted, all files in a certain area of the hard drive would be decrypted and available. When the smart card is removed, the files would automatically be re-encrypted. A security consideration here is whether to perform the actual encryption process on the smart card or on the computer. Because the smart card runs a relatively slow serial interface for I/O, bulk data transfer is not generally practical. Bringing the key off the smart card to perform the encryption in the computer does imply the risk of a malicious process obtaining a copy of the key.

Microsoft® Internet Security Framework (MISF)

The Microsoft® Internet Security Framework (MISF) provides a comprehensive set of public key security technologies that meet the needs of business, developers, and users for secure exchange of information across public networks, access control to resources and information, and electronic commerce.

MISF technologies support Internet standards, ensuring interoperability across platforms and browsers to meet users' needs for security on the Internet. To this end, MISF technology is distributed to millions of users worldwide through the Windows® and Windows NT® operating systems and through applications such as Microsoft Internet Explorer and Microsoft Internet Information Server. Using MISF tools in the Microsoft Win32® and ActiveX SDKs, developers can leverage their existing investments by extending their applications or network security to use public-key security without having to recreate their applications. MISF is built upon a flexible architecture, allowing developers to support new standards and changes in the field of cryptography while protecting their original application investments. Additionally, Microsoft is working to make key MISF interfaces available cross-platform.

Java Cards

The Open Platform Card Applet Developer's Guide (Apr. 19, 1999) provides information on how to use the Open Platform Implementation for Applet Developers and how to install and use the Open Platform software with the Java™ Card 2.1 Reference Implementation (JC21RI, Developers Release 2), which is available from Sun Microsystems and is based on the Java Card 2.1 application programming interface (API). It is targeted primarily at application providers and developers who are creating Java Card applets using the Java Card 2.1 API in conjunction with the Open Platform Card Implementation.

Other references include: *Open Platform Card Specification*, Version 2.0 (available at http://www.visa.com/openplatform); *Java Card 2.1 Application Programming Interface*, available from Sun Microsystems, Inc. at http://java.sun.com/products/javacard; *Java Card 2.1 Reference Implementation User's Guide*, available from Sun Microsystems, Inc. at http://java.sun.com/products/javacard; *Java Card 2.1 Virtual Machine Specification*, available from Sun Microsystems, Inc. at http://java.sun.com/products/javacard; Java Card 2.1 Runtime Environment (JCRE) Specification, available from Sun Microsystems, Inc. at http://java.sun.com/products/javacard; *Java Card Applet Developer's Guide*, available from Sun Microsystems, Inc. at http://java.sun.com/products/javacard; *The Java Language Specification* by James Gosling, Bill Joy, and Guy L. Steele, Addison-Wesley, 1996, ISBN 0-201-63451-1; EMV '96 Integrated Circuit Card Specification for Payment Systems, available at http://www.visa.com/chipcardspecs; and ISO 7816 Specification, Parts 1–6, available at http://www.iso.ch or http://www.ansi.org/cgi-bin/catalog2.pl?query=7816&maxhits=40. Each of the above documents is incorporated herein by reference.

Removable Media Including an Integrated Smart Card

Figure 14:
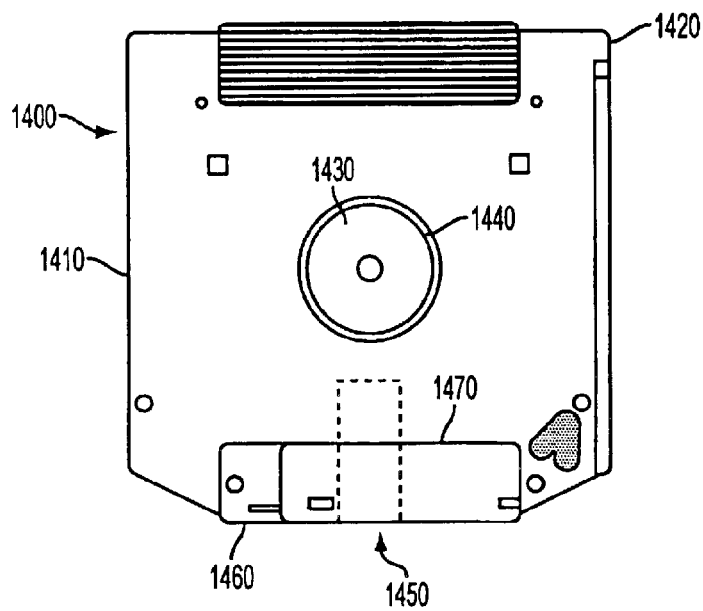
FIG. 14 shows another more specific embodiment of the present invention in the form of a removable medium.
Figure 15:
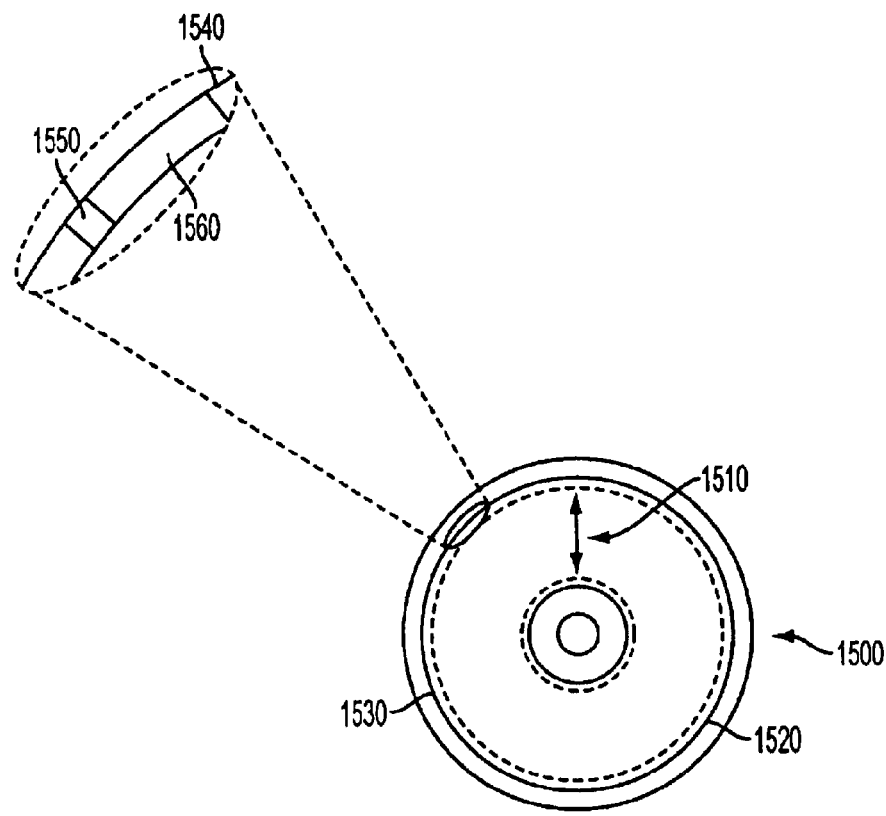
FIG. 15 diagrammatically illustrates in greater detail a portion of the information stored on the removable medium shown in FIG. 14.

Referring now to FIGS. 14 and 15, a removable medium according to the present invention will now be described. The removable medium preferably comprises a disk cartridge 1400 that can be inserted into a conventional disk drive (not shown). For example, disk cartridges of the Zip-type manufactured by Iomega Corporation would be suitable for these purposes. As shown, the disk cartridge 1400 comprises an outer casing 1410 having upper (not shown in FIG. 14) and lower 1420 shells that mate to form the casing 1410. A disk-shaped storage medium described hereinafter is affixed to a hub 1430 that is rotatably mounted within the casing 1410. An opening 1440 on the lower shell 1420 of the casing 1410 provides access to the disk hub 1430. A head access opening 1450 in the front peripheral edge 1460 of the disk cartridge 1400 provides access to the surfaces of the storage medium by the read/write heads (not shown) of the disk drive. A shutter 1470 is provided on the front peripheral edge 1460 of the disk cartridge 1400 to cover the head access opening 1450 when the disk cartridge 1400 is not in use. When the disk cartridge 1400 is inserted into the disk drive, the shutter 1470 moves to the side, exposing the head access opening 1450 and thereby providing the read/write heads of the disk drive with access to the storage medium within the disk cartridge 1400.

FIG. 15 shows one disk-shaped storage medium 1500 according to a preferred embodiment of the present invention. In the preferred embodiment, the storage medium 1500 comprises a disk having a magnetic coating for writing and reading information to and from the storage medium 1500. Preferably, information can be written on both sides of the storage medium 1500. While magnetic media is preferred, other media can be employed, and the present invention is by no means limited to use of magnetic storage media. For example, the storage medium 1500 can be a rewritable optical storage medium or a magneto-optical storage medium.

In the preferred embodiment, the storage medium has a band of about 1800 concentric data tracks 1510, which can be written to, and read from, by a user's host computer. Other track densities can be employed, however. In addition to the data tracks 1510, there are two tracks 1520, 1530 on each side of the storage medium (only one side of which is shown in FIG. 15) that contain special information pertaining to the defect characteristics of that particular storage medium. The information contained on these four tracks (i.e., two per side) is identical and, in fact, is repeated in two separate locations on each track 1520, 1530. This redundancy is necessary to ensure that the information is always available, even if some areas of the storage medium become damaged and unreadable. On each side of the storage medium 1500, one of these special information tracks, i.e., track 1520, is located at the outside of the band of data tracks 1510, and the other special information track 1530 is located to the inside of the band of data tracks 1510. None of the four special information tracks 1520, 1530 can be accessed by a host computer (not shown) to which the disk drive is interfaced. Only the disk drive, and in particular, a microprocessor within the disk drive, can access the information written on these tracks 1520, 1530.

According to the present invention, a first predetermined location is provided on the storage medium 1500 for writing, or storing, a code having a value indicative of a protection mode of the storage medium. A second predetermined location is provided on the storage medium 1500 for storing, if desired, a password associated with the code. In the present embodiment, the storage medium 1500 can be subjected to one of four different protection modes. Each protection mode specifies a different way in which access to the data tracks 1510 of the storage medium 1500 (i.e., writing and reading of information to and from the data tracks 1510) may be inhibited. In the present embodiment, the four possible protection modes of a storage medium are:

(1) Unlock Mode: neither writing, nor reading of information to and from the storage medium is inhibited; the storage medium has no read or write protection. A password is not required to change from this mode.

(2) Write Protect Mode: writing of information to the storage medium is inhibited (i.e., the storage medium is write-protected). A password is not required to change from this mode.

(3) Password Write Protect Mode: writing of information to the storage medium is inhibited (i.e., the storage medium is write-protected). A password is required to change from this mode.

(4) Read/Write Protect Mode: both writing and reading of information to and from the storage medium are inhibited (i.e., the storage medium is both write- and read-protected). A password is required to change from this mode.

In the present embodiment, the following code values are assigned to represent each of these protection modes:

| Code Value (binary) | Protection Mode |
|---|---|
| 0000 0000 | Unlock mode |
| 0000 0010 | Write Protect Mode |
| 0000 0011 | Password Write Protect Mode |
| 0000 0101 | Read/Write Protect Mode |

As described hereinafter, in addition to the four protection modes that can be applied to the storage medium, a "Temporary Unlock Mode", or command, can be applied to the disk drive (also not shown in FIG. 15) to effectively override the protection mode of the storage medium specified by the code written in the first predetermined location on the storage medium.

Referring still to FIG. 15, in accordance with the preferred embodiment of the present invention, at least the outer special information track 1520 on at least one side of the storage medium includes at least one write/read protect sector 1540 that comprises an ID field 1550 and a data field 1560. The ID field 1550 is used to identify the write/read protect sector 1540 and to distinguish that sector from other sectors in the special information track 1520. In the preferred embodiment, the data field 1560 comprises 512 bytes, however, in other embodiments, the data field 1560 may comprise a different number of bytes.

A first portion of the data field 1560 of the write/read protect sector 1540 is used for writing, or storing, one of the aforementioned codes on the storage medium to indicate the current protection mode of the storage medium 1500. This first portion of the write/read protect sector 1540 defines the first predetermined location referred to above and in the claims. A second portion of the data field 1560 of the write/read protect sector 1540 is used for writing, or storing, a password on the storage medium 1500. This second portion of the write/read protect sector 1540 defines the second pre-determined location referred to above and in the claims. Preferably, the content and arrangement of the data field 1560 is as follows:

| Byte Number | Description |
|---|---|
| 0 | Vendor Unique |
| 1 | Code indicating current protection mode of storage medium |
| 2 | Password Length |
| 3–34 | Password in ASCII Characters |
| 35–511 | Unused |

As shown, byte "0" of the data field 1460 is used to provide a unique identifier of the vendor of the storage medium 1400 and/or disk cartridge 10. Byte "1" is used to store one of the aforementioned codes in order to indicate the current protection mode applied to the storage medium 1400. Bytes "3" through "34" hold the ASCII character representation of the password, if any, currently in effect. Byte "2" specifies the password length, in bytes. The password is used to prevent unauthorized changing of the protection mode specified by the code stored in byte "1" (i.e., to prevent a new code from being written in place of the current code to which the password is associated). Finally, bytes "35" through "511" of the write/read protect sector 1540 are unused in connection with the read/write protect scheme of the present invention.

For purposes of redundancy, like the defect information described above, the write/read protect sector 1540 is duplicated twice in each of the special information tracks 1520, 1530 on each side of the storage medium 1500. This provides a total of eight identical write/read protect sectors 1540 on the storage medium. The disk drive can access any one of these eight duplicate write/read protect sectors 1540 to determine the current protection mode of the storage medium, as well as to determined the current password, if any, associated with that protection mode. This redundancy is necessary to ensure that the code and password of the current protection mode can be ascertained, even if some areas of the storage medium 1500 become damaged and unreadable. Since the duplicate write/read protect sectors 1540 are provided in respective ones of the special information tracks 1520, 1530, those sectors, like the remainder of each special information track 1520, 1530 are not accessible by the host computer to which the disk drive is interfaced. Only the disk drive can access the write/read protect sectors on the storage medium.

According to one particularly important aspect of the present invention, disk cartridge 1400 may be uniquely combined with smart card 1000 to provide a portable method of proving the dates of digital data files, while at the same time providing large amounts of recordable, removable, and secure storage media. The outer casing 1410 of disk cartridge 1400 provides a suitable platform for mounting thereon, or embedded therein, a smart card 1000 of the type using infrared light providing electrical connections and I/O channels to its corresponding smart card reader 1220. In this way, a user may not only locally certify the time and date of digital data files accessed, created, modified, stored, or transmitted with appropriate computing means, but they can also store those files on the removable medium disclosed herein.

Figure 16:
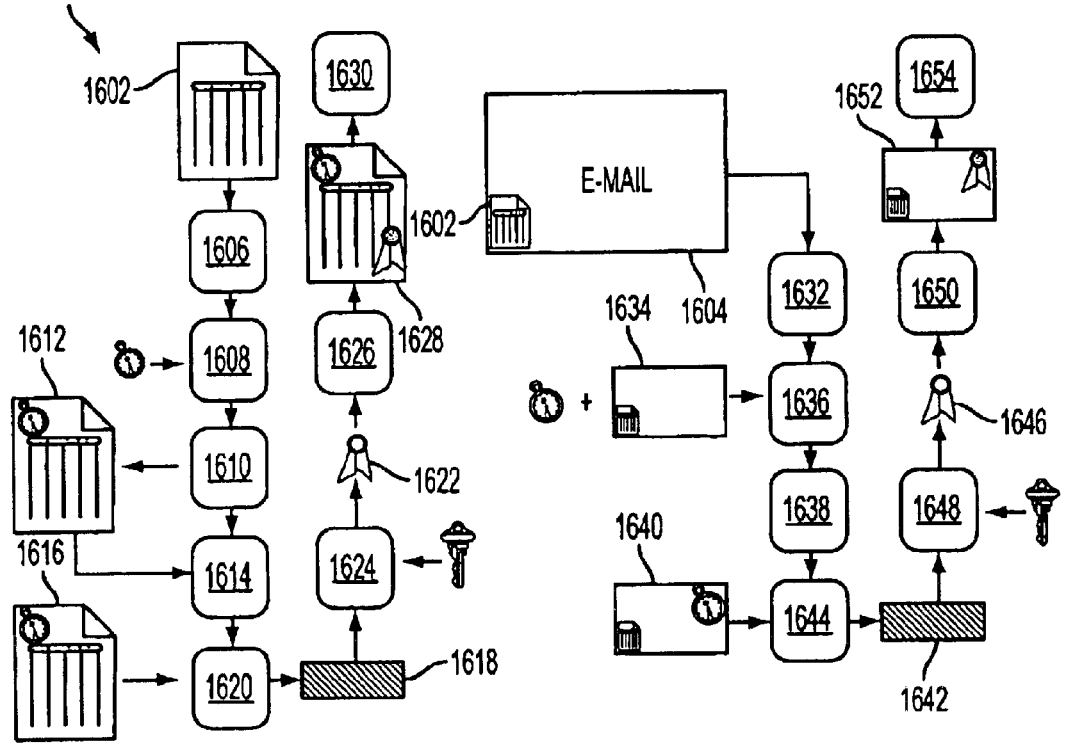
FIG. 16 shows yet another more specific embodiment of the present invention as a method for proving dates in digital data files of an e-mail format.

Referring now to FIG. 16, a presently preferred method of certifying the times and dates of a digital data file will now be explained. The method 1600 involves two separate digital data files—a document 1602 and an e-mail 1604 to which the document 1602 may be attached for transmission to a remote recipient. First, document 1602 itself may be certified in the manner described herein before. That is: (1) a trusted time source would be provided such that the document 1602 would be saved at a given moment in time at step 1606; (2) a date and a time corresponding to the moment in time would be retrieved from the trusted time source at step 1608; (3) then, the time retrieved from the trusted time source would be appended to the saved file at step 1610; (4) the saved file with the date and the time retrieved from the trusted time source appended thereto 1612 would be signed at step 1614; (5) the signed file 1616 would then be hashed to produce a digest 1618 at step 1620; (6) the digest 1618 next would be signed with a key to produce a certificate 1622 at step 1624; (7) the certificate 1622 then would be appended to the signed and saved file 1616 at step 1626; and finally (8) the file with the certificate appended thereto 1628 would be saved at step 1630.

Alternatively, an uncertified document 1602 could be simply attached to the e-mail 1604. Before sending the e-mail 1604 with the uncertified document 1602 attached thereto, a user could prompt the system to: (1) retrieve, from the trusted time source, a date and a time corresponding to the moment in time that the "send" button is pushed at step 1632; (2) then, the time retrieved from the trusted time source would be appended to the e-maildocument combination 1634 at step 1636; (3) such a combination with the date and the time retrieved from the trusted time source appended thereto 1634 would be signed at step 1638; (4) the signed combination 1640 would then be hashed to produce a digest 1642 at step 1644; (5) the digest 1642 would be signed with a key to produce a certificate 1646 at step 1648; (6) the certificate 1646 would be appended to the signed and saved combination 1640 at step 1650; and (7) the resulting combination with certificate appended thereto 1652 would finally be saved at step 1654.

As an even further alternative, both the document 1602 and the e-mail 1604 could be time-certified in the foregoing manner. Not only would the document 1602 itself have a time-certified time-stamp affixed to prove the time and date of its access, creation, modification, or transmission, but also the e-mail 1604 transmitting such time-certified document 1602 would be time-certified.

Various modifications of the methods and systems disclosed herein above are possible, without departing from the true spirit and scope of the present invention. It should, therefore, be understood that within the scope of the following claims, the present invention may be practiced otherwise than as has been specifically described in the foregoing embodiments.

What I claimed as my invention is:

1. A system for maintaining trust in the content of a digital data file, comprising:
   a trusted time source to provide a certifiable time for an unalterable time stamp, wherein said certifiable time confirms at least one of said file's access creation, modification, receipt, or transmission;
   means for receiving a request to save the file from a user;
   first means for saving the file at a moment in time;
   means for retrieving from said trusted time source a date and a time corresponding to said moment in time, wherein said moment in time is substantially the current time at said trusted time source corresponding to receipt of said request;
   first means for appending said date and said time retrieved from said trusted time source to said saved file;
   first means for signing said saved file with said date and said time retrieved from said trusted time source appended thereto;
   means for hashing said signed file to produce a digest;
   second means for signing said digest with a key to produce a certificate;
   second means for appending said certificate to said saved file; and
   second means for saving said saved file with said certificate appended thereto.

2. The system according to claim 1, wherein said first signing means comprises means for signing said saved file with said date and time retriever from said trusted time source appended thereto with a user identifier.

3. The system according to claim 1, wherein said first signing means comprises means for signing said saved file with said date and said time retrieved from said trusted time source appended thereto with a system identifier.

4. The system according to claim 1, wherein said first signing means comprises:
   first means for signing said saved file with said date and said time retrieved from said trusted time source appended thereto with a user identifier; and
   second means for signing said saved file with said date and said time retrieved from said trusted time source appended thereto with a system identifier.

5. The system according to claim 1, wherein said hashing function comprises a cryptographic key.

6. A method of maintaining trust in the content of a digital data file, comprising:

providing a trusted time source to provide a certifiable time for an unalterable time stamp, wherein said certifiable time confirms at least one of said file's access, creation, modification, receipt, or transmission;

receiving a request to save the file from a user;

saving the file at a moment in time;

retrieving from said trusted time source a date and a time corresponding to said moment in time, wherein said moment in time is substantially the current time at said trusted time source corresponding to receipt of said request;

appending said date and said time retrieved from said trusted time source to said saved file;

signing said saved file with said date and said time retrieved from said trusted time source appended thereto;

hashing said signed file to produce a digest; signing said digest with a key to produce a certificate;

appending said certificate to said saved file; and saving said file with said certificate appended thereto.

7. The method according to claim 6, wherein said first signing step comprises signing said saved file with said date and said time retrieved from said trusted time source appended thereto with a user identifier.

8. The method according to claim 6, wherein said first signing step comprises signing said saved file with said date and said time retrieved from said trusted time source appended thereto with a system identifier.

9. The method according to claim 6, wherein said first signing step comprises:

signing said saved file with said date and said time retrieved from said trusted time source appended thereto with a user identifier; and signing said saved file with said date and said time retrieved from said trusted time source appended thereto with a system identifier.

10. The method according to claim 6, wherein said hashing function comprises a cryptographic key.

11. Apparatus for maintaining trust in the content of a digital data file, comprising:

computing means, including a central processing unit (CPU), means for storing an operating system that is adapted to control the CPU, the plurality of digital data files, one or more applications programs for accessing, creating, modifying, and transmitting the plurality of digital data files, and means for controlling storage and retrieval of the plurality of digital data files to and from said storage means; and fraud prevention means, operatively coupled to said computing means, said fraud prevention module including:

a trusted time source to provide a certifiable time for an unalterable time stamD wherein said certifiable time confirms at least one of said file's access, creation, modification, receipt, or transmission;

means for receiving a request to save the file from a user;

first means for saving the file at a moment in time;

means for retrieving from said trusted time source a date and a time corresponding to said moment in time, wherein said moment in time is substantially the current time at said trusted time source corresponding to receipt of said request;

first means for appending said date and said time retrieved from said trusted time source to said saved file;

first means for signing said saved file with said date and said time retrieved from said trusted time source appended thereto;

means for hashing said signed file to produce a digest;

second means for signing said digest with a key to produce a certificate;

second means for appending said certificate to said saved file; and second means for saving said file with said certificate appended thereto.

12. The apparatus according to claim 11, wherein said first signing means comprises means for signing said saved file with said date and said time retrieved from said trusted time source appended thereto with a user identifier.

13. The apparatus according to claim 11, wherein said first signing means comprises means for signing said saved file with said date and said time retrieved from said trusted time source appended thereto with a system identifier.

14. The apparatus according to claim 11, wherein said first signing means comprises:

first means for signing said saved file with said date and said time retrieved from said trusted time source appended thereto with a user identifier; and second means for signing said saved file with said date and said time retrieved from said trusted time source appended thereto with a system identifier.

15. The apparatus according to claim 11, wherein said fraud prevention means comprises a smart card.

16. The apparatus according to claim 15, wherein said smart card comprises a contact-type smart card.

17. The apparatus according to claim 15, wherein said smart card comprises a contactless-type smart card.

18. The apparatus according to claim 17, further comprising a removable medium coupled to said smart card and adapted to store the plurality of digital data files thereon.

19. The apparatus according to claim 18, wherein said removable medium is selected from the group consisting of a floppy disk, an optical disk, a CD-ROM, a CD-R, a CD-RW, a DVD disk, a magneto-optical disk, a magnetic tape, a memory chip, and a carrier wave used to carry computer-readable electronic data used in transmitting and receiving e-mail or in accessing a network, including the Internet, intranets, extranets, virtual private networks (VPN), local area networks (LAN), and wide area networks (WAN).

20. The apparatus according to claim 15, further comprising a smart card reader which includes means for verifying the authenticity of said file with said certificate appended thereto.

* * * * *

UNITED STATES PATENT AND TRADEMARK OFFICE
CERTIFICATE OF CORRECTION

PATENT NO. : 6,792,536 B1
DATED : September 14, 2004
INVENTOR(S) : Steven W. Teppler It is certified that error appears in the above-identified patent and that said Letters Patent is hereby corrected as shown below:

Column 13,
Line 30, "used to generated a" should read -- used to generate a --.

Column 17,
Line 44, "voltage do would" should read -- voltage would --.

Column 29,
Line 19, "respond with an another" should read -- respond with another --.

Column 33,
Line 28, "solution which" should read -- solution, which --;
Line 51, "senders public key" should read -- sender's public key --.

Column 40,
Line 21, "What I claimed as" should read -- What I claim as --.
Lines 22 and 66, "trust in the content" should read -- trust in content --
Line 33, "substantially the cur-" should read -- substantially a cur- --.

Column 41,
Line 9, "substantially the current" should read -- substantially a current --.
Line 41, "trust in the content" should read -- trust in content --.

Column 42,
Line 4, "the current time" should read -- a current time --.

Signed and Sealed this

Twenty-third Day of November, 2004

JON W. DUDAS
*Director of the United States Patent and Trademark Office*